(12) United States Patent
Nagano et al.

(10) Patent No.: US 8,972,407 B2
(45) Date of Patent: *Mar. 3, 2015

(54) INFORMATION PROCESSING METHOD FOR DETERMINING WEIGHT OF EACH FEATURE IN SUBJECTIVE HIERARCHICAL CLUSTERING

(75) Inventors: Toru Nagano, Kanagawa (JP); Masafumi Nishimura, Kanagawa (JP); Takashima Ryoichi, Kobe (JP); Ryuki Tachibana, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/604,796

(22) Filed: Sep. 6, 2012

(65) Prior Publication Data

US 2012/0330957 A1    Dec. 27, 2012

Related U.S. Application Data

(63) Continuation of application No. 13/535,904, filed on Jun. 28, 2012.

(51) Int. Cl.
  *G06F 17/30* (2006.01)
  *G06F 12/12* (2006.01)
  *G06F 12/08* (2006.01)

(52) U.S. Cl.
  CPC .......... *G06F 12/121* (2013.01); *G06F 12/0804* (2013.01); *G06F 2212/1016* (2013.01); *G06F 2212/2022* (2013.01)
  USPC ............. 707/737; 707/749; 707/776; 706/20; 706/47

(58) Field of Classification Search
  CPC ............ G06F 17/277; G06F 17/30713; G06F 17/153; G06F 17/30598; G06F 17/3069
  See application file for complete search history.

(56) References Cited

U.S. PATENT DOCUMENTS 8,429,168 B1 * 4/2013 Chechik et al. ............... 707/741
8,478,766 B1 * 7/2013 Tsypliaev et al. ............. 707/756

(Continued)

FOREIGN PATENT DOCUMENTS

JP    07-121709    5/1995
JP    2002-183171    6/2002

(Continued)

OTHER PUBLICATIONS

Kumar, et al, "Semisupervised Clustering with Metric Learning using Relative Comparisons", Oct. 25, 2007, IEEE.
Kamishima, et al, "Supervised Clustering and Absolute/Relative Clustering", 2006 Workshop on Information-Based Induction Science. Osaka, Japan.

(Continued)

*Primary Examiner* — Anh Tai Tran
(74) *Attorney, Agent, or Firm* — Jeff Tang; Anne Vachon Dougherty

(57) ABSTRACT

An information processing apparatus determines a weight of each physical feature for hierarchical clustering by acquiring training data of multiple pieces of content in triplets with label information indicating a pair specified by a user as having a highest degree of similarity among three contents of the triplet and executing hierarchical clustering using a feature vector of each piece of content of the training data and the weight of each feature to determine the hierarchical structure of the training data. The information processing apparatus updates the weight of each feature so that the degree of agreement between a pair combined first as being the same clusters among three contents of the triplet in a determined hierarchical structure and a pair indicated by label information corresponding to the triplet increases.

5 Claims, 14 Drawing Sheets

(56) References Cited

U.S. PATENT DOCUMENTS

2007/0179921 A1* 8/2007 Zitnick et al. .................. 706/20
2009/0012842 A1* 1/2009 Srinivasan et al. ............. 705/10
2009/0182743 A1* 7/2009 Owens et al. .................... 707/6

FOREIGN PATENT DOCUMENTS

| JP | 2006-127446 | 5/2006 |
| JP | 2007-219928 | 8/2007 |
| JP | 2007-334388 | 12/2007 |

OTHER PUBLICATIONS

Xing, Eric, et al, "Distance metric learning, with application to clustering with side information", In Advances in Neural Information Processing Systems 15, vol. 15 (2002), pp. 505-512.

Schultz, Matthew, et al, "Learning a distance metric from relative comparisons", In Advances in Neural Information Processing Systems 16, MIT Press, Cambridge, MA. (2004).

Bilenko, Mikhail, et al, "Integrating Constraints and Metric Learning in Semi-Supervised Clustering", Proceedings of the 21st International Conference on Machine Learning, Banff, Canada, Jul. 2004, pp. 81-88.

* cited by examiner (a)

| UNSUPER-VISED | PCA | Forward | FORWARD (CLASSIFIED INTO HIERARCHICAL LAYERS) | THIRD EXAMPLE | THIRD EXAMPLE+WEIGHTS FOR CLASSIFIED HIERARCHICAL LAYERS |
|---|---|---|---|---|---|
| 40.3 | 38.8 | 41.5 | 35.3 | 36.4 | 32.9 |

INFORMATION PROCESSING METHOD FOR DETERMINING WEIGHT OF EACH FEATURE IN SUBJECTIVE HIERARCHICAL CLUSTERING

TECHNICAL FIELD AND BACKGROUND OF THE INVENTION

The present invention relates to a hierarchical clustering technique, and in particular to an information processing apparatus, method and program for determining a weight of each feature which makes it possible to hierarchically cluster content expressed as a combination of physical features so that the degree of subjective similarity is reflected.

There is a demand for clustering multimedia content, such as voices, images, sentences and websites, so that degrees of subjective similarity among pieces of emotional content that a person feels from the content can be reflected. Here, the emotional content means not only feelings a person clearly expresses, such as anger and pleasure, but also such that can be felt by a person but cannot necessarily be classified in words, including subtle mental attitudes. Whether pieces of emotional content are subjectively similar or different depends on the degree of subtlety a receiving-side person is ready to distinguish. Therefore, in order to satisfy the above demand, it is desirable to use hierarchical clustering in which the number of clusters is not determined beforehand. In general, multimedia content is expressed by combination of physical features. However, all physical features do not necessarily have equal importance. Therefore, it is necessary to learn the weight of each physical features so as to reflect the degree of subjective similarity on a result of clustering.

As a conventional clustering technique in which the degree of subjective similarity from a viewpoint of a user is reflected, an article by Eric P. Xing, Andrew Y. Nq, Michael I. Jordan, Stuart Russell, entitled "Distance metric learning, with application to clustering with side information", In Advances in Neural Information Processing Systems 15, Vol. 15 (2002), pp. 505-512. exists. In constrained clustering disclosed in the aforementioned article, a pair to be necessarily included in the same cluster (ML: must-link) and a pair to be necessarily included in different clusters (CL: cannot-link) are used as training data. As shown in FIG. 1(a), at the time of learning, training data (ML/CL pairs) 100 is inputted to a supervised clustering section 110, and a supervised clustering algorithm is adjusted to satisfy constraints of the ML/CL pairs. At the time of operation, test data 105 is inputted to the supervised clustering section 110, and a clustering result 115 is acquired with the use of the adjusted algorithm.

As described above, the constrained clustering technique of Xing, et al requires preparation of ML/CL-type constraint, as training data. However, whether or not to classify elements of a certain data pair into the same cluster depends on the number of classification clusters. For example, even if the data pair is such that should be ML in the case of classification into four clusters, it may be appropriate that the data pair should be CL in the case of more detailed classification into eight clusters. Therefore, training data in the ML/CL type cannot be created unless the number of classification clusters is determined beforehand, and the technique cannot be applied to hierarchical clustering in which the number of clusters is not determined beforehand.

As another conventional clustering technique in which the degree of subjective similarity from a viewpoint of a user is reflected, an article by Matthew Schultz, Torsten Joachims, entitled "Learning a distance metric from relative comparisons", In Advances in Neural Information Processing Systems 16, MIT Press, Cambridge, Mass., (2004) exists. In semi-supervised clustering disclosed by Schultz, et al, for each of sets (X, A and B) of training data, it is specified by a user which of A and B, X is closer to (hereinafter, such training data is referred to as XAB-type similarity data). As shown in FIG. 1(b), at the time of learning, training data (XAB-type similarity data) 120 including the user's specification is inputted to a supervised weight learning section 125, and a weight 130 of each physical feature is determined so that a relationship indicated by the training data 120 is satisfied. At the time of operation, test data 135 is inputted to an unsupervised clustering section 140, and unsupervised clustering is performed with the use of the weight 130 of each physical feature, and a clustering result 145 is acquired.

On the other hand, in the semi-supervised clustering disclosed by Schultz, et al, it is sufficient to prepare training data indicating which of A and B, X is closer to, and, therefore, the training data can be created even if the number of classification clusters is not determined first. The training data, however, has a problem that about ⅓ of the training data is invalid for evaluating a clustering result. For example, it is assumed that, as a result of hierarchical clustering of three pieces of content, X, A and B, A and B are combined first before combination with X as shown in FIG. 3(a). Then, which of A and B, X is closer to cannot be judged from a clustering result, and, therefore, it is not possible to evaluate the clustering result using training data. Although it is possible that the weights of features can be learned by increasing the number of training data, the learning of the weights is performed in the direction of increasing invalid data because it results in higher scores. After all, it becomes necessary to devise the design of a learning algorithm, and complicated processing is required.

Other conventional techniques found in prior-art technique search for the present invention will be described below.

In JP2007-334388A, problems to be solved are to make it possible to put together documents which a person feels to be similar to one another, into the same cluster with a high accuracy and to obtain a clustering result on which a user's intention is reflected. JP2007-334388A discloses a clustering method in which common words appearing in common in documents in multiple clusters specified by a user are acquired; among the common words, such common words are selected that the frequency of appearance in the clusters specified by the user is relatively high in comparison with the frequency of appearance in clusters which have not been specified by the user; the common words are recorded in keyword storage means as keywords; and, at the time of clustering the same or another set of documents, the clustering is performed with the influence of the keywords recorded in the keyword storage means are emphasized.

In the technique of JP2007-334388A, when clustering is performed multiple times, feedback is given by a user about correct pairs and wrong pairs in the previous clustering result. However, since this feedback can be said to be ML/CL-type training data, the technique of JP2007-334388A cannot be applied to hierarchical clustering in which the number of clusters is not determined first because of the same reason described with regard to Xing, et al.

JP2006-127446A discloses an image processing apparatus distinguishing image information by a classifier learned on the basis of training data, the image processing apparatus including: feature extracting means extracting features from image information; combined feature calculating means calculating a combined feature, which is a combination of the features extracted by the feature extracting means; learning means performing learning the classifier by the features calculated by the combined feature calculating means and the features extracted by the feature extracting means; collation means applying training data to the discriminator learned by the learning means to collate a discrimination result with an ideal classification result given from the outside; and optimization means changing a method for combination of features by the combined feature calculating means on the basis of a result of the collation means.

In JP2006-127446A, a k-means method and a k-nearest neighbor method are given as clustering methods. That is, the technique of JP2006-127446A is to be applied to a nonhierarchical clustering method, and it is not possible to apply the technique of JP2006-127446A to hierarchical clustering in which the number of clusters is not determined first.

JP07-121709A discloses a pattern identification apparatus including: means for referring to an identification space prepared in advance to perform pattern identification of a sample pattern by a nearest neighbor method; means for determining the confidence of identification on the basis of an identification distance sequence obtained by the pattern identification; and means for judging whether or not the identification space referred to is a good identification space for the identification of the sample pattern. JP07-121709A further discloses means for preparing an identification space for a category which the sample pattern may come under; control means for, when receiving a identification result given by the identification means on the basis of the confidence of identification obtained by referring to an identification space prepared in advance and performing pattern identification of an already-known sample pattern, and the judgment result indicating that the identification space is not a good identification space, controlling the creating means to cause a new identification space using features different from those of the identification space prepared in advance to be prepared for the category of the already-known sample pattern; and means for accumulating the identification space prepared in advance and the identification space prepared newly, the identification spaces being hierarchically associated with each other.

In the technique of JP07-121709A, by repeatedly continuing a pattern recognition process for a category which cannot be recognized by pattern recognition, a hierarchical structure can be obtained as a result. Such a hierarchical structure, however, does not indicate degrees of similarity among data. The clustering disclosed in JP07-121709A is clustering in which the number of clusters is determined first. As described above, it is not possible to, even if the technique of JP07-121709A is used, satisfy the demand for clustering multimedia content so that degrees of subjective similarity among pieces of emotional content that a person feels from the content can be reflected.

In JP2002-183171A, a problem to be solved is to provide a document clustering system capable of classifying document data into the number of clusters according to clustering targets. JP2002-183171A discloses a document clustering system performing singular value decomposition of a set of feature vectors of documents created by feature vector creating means 103; creating a document similarity vector 108 for calculating degrees of similarity among documents from a singular value decomposition result 106; using the document similarity vector for a target document to calculate a distance between the document and the cluster centroid, by cluster creating means 110; increasing the number of dimensions of the document similarity vector used for the first classification to further perform the second classification of the same target document; comparing results of both classifications and setting clusters with little change as stable clusters; excluding documents of the stable clusters from targets and selecting target documents for the next classification by the cluster creating means, by data selecting means 109; and repeating this trial.

In the technique of JP2002-183171A, each of two kinds of feature vectors is used to perform clustering, and such clusters that are obtained from both of the results are adopted as stable clusters. Consequently, training data is not required. Therefore, in the technique of JP2002-183171A, it is not possible to learn the weights of features so that such clustering can be performed that degrees of subjective similarity among emotional content that a person feel is reflected.

Mikhail Bilenko, Sugato Basu, Raymond J. Mooney, in an article entitled "Integrating Constraints and Metric Learning in Semi-Supervised Clustering", Proceedings of the 21st International Conference on Machine Learning, Banff, Canada, July, pp. 81-88 disclose a semi-supervised clustering method in which the conventional constraint-based method and distance-based method (distance-function learning method) are integrated.

In the technique of Mikhail Bilenko, Sugato Basu, Raymond J. Mooney, "Integrating Constraints and Metric Learning in Semi-Supervised Clustering", Proceedings of the 21st International Conference on Machine Learning, Banff, Canada, July, pp. 81-88, both of ML/CL-type constraint data and XAB-type relative-similarity data are used as training data. Therefore, the technique of Bilenko, et al includes both of the problem described with relation to the technique of Xing, et al and the problem with relation to the technique of Schultz, et al.

SUMMARY OF THE INVENTION

The present invention has been made in view of the above problems in the conventional techniques, and an object of the present invention is to provide an information processing apparatus, method and program making it possible to learn the weights of physical features and adopt the weights of the features according to the number of clusters so that, for content expressed as a combination of physical features, such hierarchical clustering can be performed that the degree of subjective similarity is reflected, and, consequently, capable of realizing that hierarchical clustering is performed so that degrees of subjective similarity among pieces of emotional content that a persons feels from the content can be reflected.

In order to solve the above problems of the conventional techniques, the present invention provides an information processing apparatus which determines the weight of each feature in subjective hierarchical clustering of content expressed as a combination of physical features and which have the characteristics described below. The information processing apparatus of the present invention acquires multiple pieces of content separated in a set of three pieces of content (hereinafter referred to as a triplet) together with label information as training data, the label information indicating a pair specified by a user as having the highest degree of similarity among the three pairs in each set. The information processing apparatus executes hierarchical clustering using a feature vector of each piece of content of the training data and the weight of each feature to determine the hierarchical structure of the training data. The information processing apparatus updates the weight of each feature so that the agreement between a pair combined first as being the same clusters among the three pairs in a triplet in a determined hierarchical structure and a pair indicated by label information corresponding to the triplet increases.

Preferably, the information processing apparatus calculates an error rate which is a rate of the number of such triplets that a result of the hierarchical clustering and the label information do not agree with each other to the total number of the triplets. The information processing apparatus repeatedly performs hierarchical clustering for the training data using the updated weight of each feature, and outputs the updated weight of each feature in response to the error rate converging to a predetermined value.

More preferably, the information processing apparatus determines, for each of such triplets that the hierarchical clustering result and the label information do not agree with each other, a feature presumed to be a cause of the disagreement, and updates the weight of each feature by decreasing the weight of the feature determined to be the cause of the disagreement so as to be smaller than the weights of features that are not determined to be the cause of the disagreement. Here, if difference between the values of the feature of a pair indicated by label information corresponding to a triplet in disagreement is relatively large in comparison with difference between the values of the corresponding feature of the other pairs of the triplet in disagreement, the information apparatus may presume the feature to be the cause of the disagreement.

Preferably, the information processing apparatus attaches a weight to each of the triplets. The information processing apparatus performs, for each feature, hierarchical clustering on the weighted triplets using only the feature, and determines the error rate of the hierarchical clustering for each feature in consideration of the weight of each triplet. The information processing apparatus updates the weight of a feature having the lowest error rate using the lowest error rate, and updates the weight of each of triplets with the updated weight of the feature. The information processing apparatus outputs the updated weight of each feature in response to the hierarchical clustering result not being improved any more or the update processing having been performed the number of times corresponding to the number of total features. More preferably, the information processing apparatus updates the weight of each of triplets with the updated weight of the feature so that the weights of the triplets for which the hierarchical clustering result and the label information do not agree with each other is larger than the weights of the triplets for which the hierarchical clustering result and the label information agree with each other.

Preferably, the information processing apparatus attaches a weight to each of the triplets. The information processing apparatus performs, for each feature, hierarchical clustering on the weighted triplets using only the feature, and determines the error rate of the hierarchical clustering for each feature in consideration of the weight of each triplet. The information processing apparatus determines a temporary weight of a feature having the lowest error rate using the lowest error rate, and updates the weight of each of the triplets with the temporary weight. The information processing apparatus repeats the above series of processings, and outputs, for each feature, the sum of temporary weights determined for the feature as the weight of the feature in response to the hierarchical clustering result not being improved any more or the update processing having been executed the number of times larger than the total number of features. More preferably, the information processing apparatus updates the weight of each of the triplets with the temporary weight of the feature so that the weights of the triplets for which the hierarchical clustering result and the label information do not agree with each other is larger than the weights of the triplets for which the hierarchical clustering result and the label information agree with each other.

Preferably, the information processing apparatus acquires one or more levels l for which the weight of each feature is to be switched and the upper-limit number of clusters $N_l$ for each level l. The information processing apparatus performs hierarchical clustering in a bottom-up method until the upper-limit number of clusters reaches $N_{l-1}$ using the weight of each feature determined for a level l–1, which is one level lower than the level l for which the weight is to be switched. The information processing apparatus performs the series of processing for determining weights, with the number of $N_{l-1}$ clusters as new training data, and outputs the determined weight of each feature as the weight of each feature for the level l.

Preferably, the information processing apparatus acquires test data and a specification of a hierarchical layer to be displayed, and, in response to the acquisition of the test data, executes hierarchical clustering on the test data using the learned weight of each feature. The information processing apparatus takes out the test data classified into the number of clusters of the specified hierarchical layer, from a hierarchical structure obtained as a result of the hierarchical clustering, and displays it on a display section.

The present invention has been described as an information processing apparatus which determines the weight of each feature in subjective hierarchical clustering. However, the present invention can be also grasped as a method for determining the weight of each feature in subjective hierarchical clustering performed by such an information processing apparatus, and a program for determining the weight of each feature in subjective hierarchical clustering, which is installed in and executed by such an information processing apparatus.

According to the present invention, a hierarchical structure, which is a result of hierarchical clustering, is evaluated with the use of label information indicating a pair specified by a user as one having the highest similarity among three contents of the triplet, and the weight of each feature is updated on the basis of a result of the evaluation. Therefore, it is possible to effectively and accurately learn the weight of each physical feature so that the degree of subjective similarity can be reflected on a clustering result. Furthermore, by using the learned weight of each feature, it is possible to perform clustering so that degrees of subjective similarity among pieces of emotional content that a person feel can be reflected. Furthermore, it becomes possible to change the weight of each feature according to the number of clusters, and it is possible to simulate a human characteristic in classification that he pays attention to different features between the case of performing rough classification and the case of performing detailed classification.

BRIEF DESCRIPTION OF THE DRAWINGS

FIG. 13 is an error rate table showing results of multiple experiment examples and results of comparison examples of conventional methods.

DETAILED DESCRIPTION OF INVENTION

Figure 1:
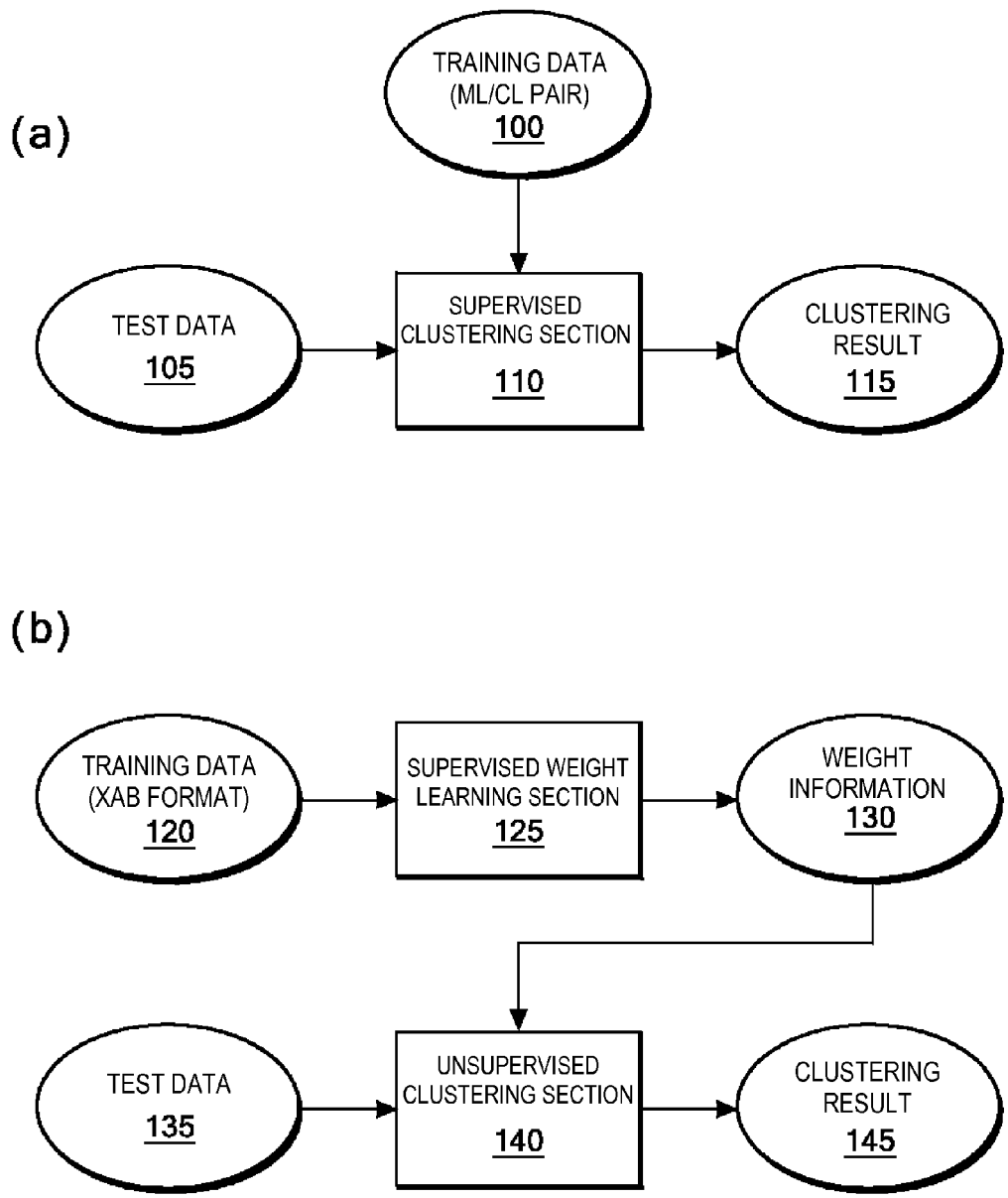
FIG. 1(a) is a diagram illustrating the outline of constrained clustering, which is a conventional technique.
FIG. 1(b) is a diagram illustrating the outline of semi-supervised clustering based on distance, which is a conventional technique.

An embodiment for practicing the invention as claimed in the application concerned will be described below in detail on the basis of drawings. The embodiment below, however, does not limit the invention according to the claims, and all combinations of characteristics described in the embodiment are not necessarily required for solution means of the invention. Through the whole description of the embodiment, the same components are given the same reference numerals.

1. Training Data in a New Format

A method for expressing multimedia content targeted by clustering according to an embodiment of the present invention will be described. In general, multimedia content, such as voices, images, sentences and websites are expressed by a combination of physical features, that is, a feature vector $V_i$ which is a vector in which multiple features $X_{i,k}$ are arranged. Here, i denotes an index of the content, and k denotes the dimension of the vector. When the number of dimensions is denoted by D, $V_i = [X_{i,1}, X_{i,2}, X_{i,3}, \ldots, X_{i,D}]^T$ is satisfied. Here, T indicates that the matrix is a transposed matrix. For example, in the case of voice, the fundamental frequency [Hz], the length of duration [msec] and the like can be used as the features $X_{i,k}$. However, since a variance of the features $X_{i,k}$ differs for each dimension k, it is desirable to normalize the features $X_{i,k}$ so that each of the average and the variance becomes 0 and 1, respectively, as shown in the following formula (1).

[Formula 1]

$$X'_{i,k} = \frac{(X_{i,k} - \mu_k)}{\sigma_k} \qquad (1)$$

$\mu_k$: Average of feature quantities $X_{i,k}$ of the k-th dimension
$\sigma_k$: Standard deviation of feature quantities $X_{i,k}$ of the k-th dimension However, all features do not necessarily have equal importance to represent a certain piece of content. That is, the degree of contribution of the feature $X_{i,k}$ to the degree of subjective similarity at the time of judging whether emotional content that a person feels from content is subjectively similar or not differs according to each of the features $X_{i,k}$. Therefore, in order to cluster content so that the degree of subjective similarity can be reflected, it is preferable to use the normalized features $X_{i,k}$ not immediately but after multiplying it by a weight coefficient $w_k$ indicating the degree of contribution as shown in the following formula (2). Therefore, in the present invention, the weight $w_k$ of each of the features $X_{i,k}$ is learned to show the degree of contribution to the degree of subjective similarity.

[Formula 2]

$$X''_{i,k} = \frac{w_k \times (X_{i,k} - \mu_k)}{\sigma_k} \qquad (2)$$

Figure 3:
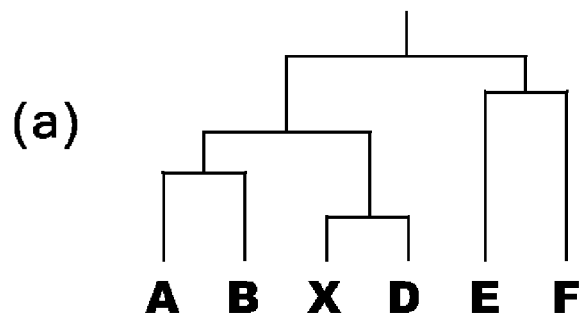
FIG. 3(a) is a diagram illustrating a result of the semi-supervised clustering based on distance, which is a conventional technique.
FIG. 3(b) is a diagram illustrating a result of clustering according to the embodiment of the present invention.
Figure 3:
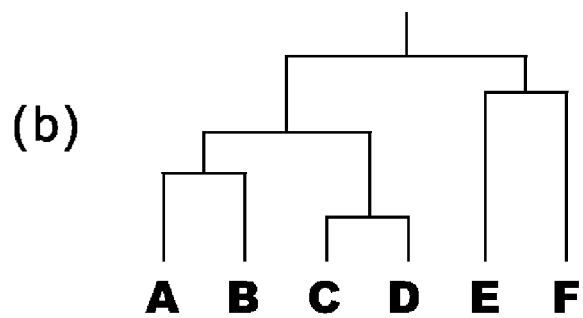

$W_k$: Weight of feature quantities of the k-th dimension
$\mu_k$: Average of feature quantities $X_{i,k}$ of the k-th dimension
$\sigma_k$: Standard deviation of feature quantities $X_{i,k}$ of the k-th dimension The format of training data for learning disclosed in the conventional techniques, however, does not suit the purpose of the present invention as described above. Hierarchical clustering in which the number of clusters is not determined is suitable for representation of the degree of subjective similarity. However, in order to prepare two kinds of constraint data, ML data and CL data, as training data, it is necessary to determine the number of classification clusters first. On the other hand, in the case of using XAB-type similarity data as training data, it is not necessary to determine the number of clusters first. Information obtained from the XAB-type similarity data is, however, only information of Sim(X,A)>Sim(X,B), for example, when content X is more similar to content A (Sim(m,n) is assumed to be a function returning the degree of similarity between content m and content n). Therefore, as shown FIG. 3(*a*), when content A and content B are combined first among the pieces of content X, A and B in a hierarchical structure obtained as a result of clustering, it is not possible to evaluate the hierarchical structure using the AB-type similarity data. After all, ⅓ of the AB-type similarity data is invalid for evaluation of a clustering result.

Therefore, in the present invention, a new format of training data is introduced which makes it possible to learn the weight of each feature so that the degree of subjective similarity is reflected on a clustering result. Such a new format for learning the weight of features is set-of-three-pieces-of-content data, which is a triplet attached with label information indicating a pair specified by a user as having the highest degree of similarity among the pieces of content, or three pairs in the triplet. Training data in this new format can be created without determining the number of clusters first. Information obtained from the triplet attached with label information is, for example, when the similarity between content A and content B is the highest, information indicating Sim(A,B)>Sim(B,C) and Sim(A,B)>Sim(C,A). Therefore, even if content A and content B are combined first among pieces of content A, B and C in a hierarchical structure obtained as a result of clustering as shown FIG. 3(b), it is possible to evaluate the hierarchical structure using the triplet attached with label information. More specifically, when, for a hierarchical structure which is a result of clustering, a pair combined first among the pieces of content A, B and C is calculated, and the pair agrees with a pair indicated by the label information, the hierarchical structure can be evaluated as a correct answer, and, otherwise, as a wrong answer. The work of selecting the pair having the highest degree of similarity from the triplet is equivalent to work of selecting one piece of content which is the most dissimilar in a triplet, and, therefore, the load of the work is almost the same as the case of XAB-format training data.

2. Outline of the Whole Invention

Figure 2:
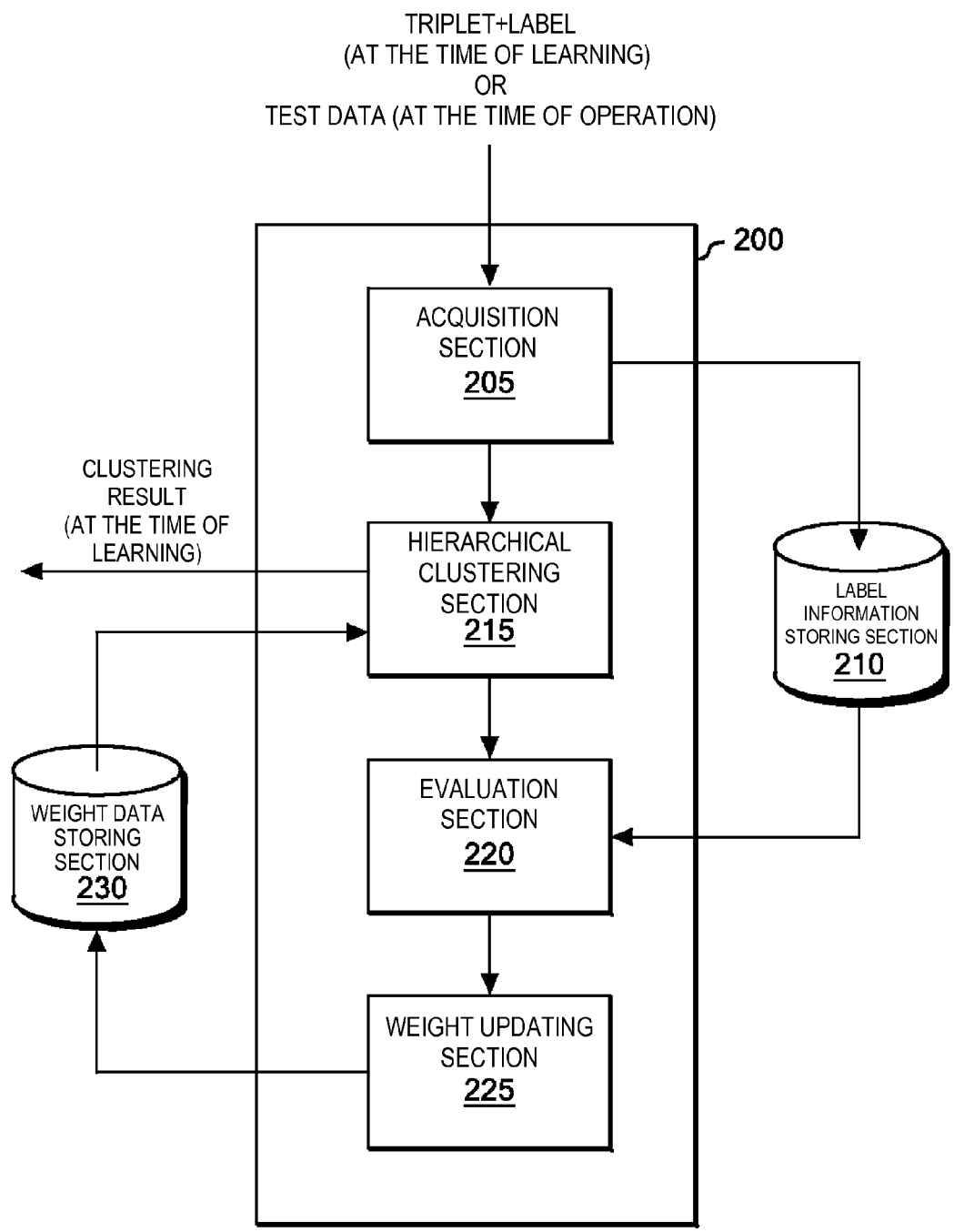
FIG. 2 is a functional block diagram of a weight learning apparatus 200 according to an embodiment of the present invention.

An weight learning method according to the embodiment of the present invention using the triplet attached with label information described above will be described with reference to FIG. 2. FIG. 2 is a functional block diagram of a weight learning apparatus 200 according to the embodiment of the present invention. The weight learning apparatus 200 is provided with an acquisition section 205, a label information storing section 210, a hierarchical clustering section 215, an evaluation section 220, a weight updating section 225 and a weight data storing section 230.

At the time of learning, the acquisition section 205 acquires multiple triplets together with label information as training data, the label information indicating a pair specified by the user as having the highest degree of similarity among three contents of a triplet. There are no conditions for the number and combination of triplets required for learning, and selection of the triplets can be performed randomly. However, similarly to general training data, the larger the number of training data is, the more desirable it is. Content to be training data is required to be nearly of the nature of content to be test data used at the time of operation. At the time of operation, the acquisition section 205 acquires content which is the test data. The acquisition section 205 may acquire a specification of a hierarchical layer to be displayed as a clustering result, from the user. The above acquisition may be directly performed via an input device by the user, or the data may be read and acquired from a storage device if the data is prepared in the storage device in advance. Of course, the data may be acquired from another computer via a network.

The label information storing section 210 stores label information for each triplet acquired by the acquisition section 205 in such a format that which triplet the label information agrees with is found. The label information stored in the label information storing section 210 is used for evaluation by the evaluation section 220 to be described later.

At the time of learning, the hierarchical clustering section 215 executes hierarchical clustering using a feature vector of each piece of content of training data and the weight of each feature to determine the hierarchical structure of the training data. The hierarchical clustering may be agglomerative-type clustering in which clusters are sequentially combined in a bottom-up direction or may be partitioning-type clustering in which clusters are sequentially divided in a top-down direction. In this embodiment, the agglomerative-type clustering is adopted. A procedure for the agglomerative-type clustering is as shown below.

1. Each piece of content is set as a cluster constituted by one element.
2. For all pairs of clusters, the distance between the clusters is calculated.
3. A pair of clusters with the shortest distance are combined.
4. If there are two or more clusters, the flow returns to 2. On the other hand, if there is one cluster, the process of generating the cluster is outputted as a hierarchical structure to be determined.

There are four methods, a nearest neighbor method, a furthest neighbor method, a group average method and a Ward's method according to how to determine the distance for a pair of clusters. Since the Ward's method is used in an experiment to be described later, a method of calculating a distance in the Ward's method will be described below.

A distance in the Ward's method is defined by the following formula (3).

[Formula 3]

$$ESS = \sum_j \sum_{i \in C_j} \sum_k w_k \times |Xi_{,j,k} - \mu_{j,k}|^2 \quad (3)$$

$W_k$: Weight of feature quantity of k-th dimension
$C_j$: j-th cluster
$X_{i,j,k}$: Feature quantity of k-th dimension of i-th content belonging to j-th cluster
$\mu_{j,k}$: Average of feature quantities of k-th dimension of pieces of content belonging to j-th cluster A distance ESS (Error of Sum of Squares) in the Ward's method defines the badness of clustering, and it is expressed, for all pieces of content included in the cluster $C_j$, as a weighted sum of square errors from the center $\mu_{j,k}$ of the cluster $C_j$. In the Ward's method, such a combination of clusters that minimizes this ESS indicating the badness of clustering is selected, and the clusters are merged. For further details of the Ward's method, see, for example, "Hierarchical grouping to optimize an objective function" by Joe H. Ward, Journal of the American Statistical Association, vol. 58. no. 301, pp. 236-244, March 1963.

The weight of each feature is updated by the weight updating section 225 to be described later, and the hierarchical clustering section 215 repeatedly performs hierarchical clustering on leaning data using the updated weight of each feature. A hierarchical structure, which is a result of the hierarchical clustering, is handed over to the evaluation section 220 and the weight updating section 225 to be described later.

At the time of operation, in response to acquisition of test data by the acquisition section 205, the hierarchical clustering section 215 executes hierarchical clustering on the test data using the weight updated for each feature by the weight updating section 225 last. A hierarchical clustering method to be adopted is the same as the method used at the time of learning. The hierarchical clustering section 215 may store a result of the hierarchical clustering into a storage section (not shown) of the weight learning apparatus 200. After that, the result of the hierarchical clustering is displayed by the display section (not shown) of the weight learning apparatus 200. In the case where a specification of a hierarchical layer to be displayed is acquired by the acquisition section 205, test data classified into the number of clusters of the specified hierarchical layer is determined on the basis of the hierarchical structure stored in the storage section and displayed on the display section.

The evaluation section 220 calculates an error rate which is a rate of the number of such triplets that a hierarchical clustering result does not agree with label information to the total number of triplets. Comparison between a hierarchical clustering result and label information is performed as shown below. First, in a hierarchical structure, which is a result of clustering, a pair combined first in a triplet is calculated. For example, if it is assumed that the triplet is (A, B, C), and an acquired hierarchical structure is that shown in FIG. 3(b), a pair determined by the evaluation section 220 is (A, B). Then, label information corresponding to the triplet is read out from the label information storing section 210. If a pair indicated by the read-out label information agree with the calculated pair, a correct answer counter $C_s$ is incremented by one. If the pair indicated by the label information does not agree with the calculated pair, a wrong answer counter $C_f$ is incremented by one. The comparison process ends for all the triplets, an error rate $\epsilon$ is determined by the following formula (4).

[Formula 4]

$$\varepsilon = \frac{C_f}{C_s + C_f} \quad (4)$$

The evaluation of a clustering result by the evaluation section 220 is performed for each hierarchical clustering by the hierarchical clustering section 215.

The weight updating section 225 updates the weight of each feature so that the degree of agreement between a pair combined first as being the same clusters in a triplet in a hierarchical structure, which is a result of clustering, and a pair indicated by corresponding label information increases. A specific update method is to be described later with reference to FIGS. 7 to 9. As described above, the hierarchical clustering section 215 repeatedly performs hierarchical clustering on training data using the weight of each feature updated by the weight updating section 225. The weight updating section 225 also repeatedly updates the weights of all or a part of features on the basis of a hierarchical structure, which is a result of hierarchical clustering by the hierarchical clustering section 215. Then, the weight updating section 225 outputs the weight updated last for each feature in response to a hierarchical clustering result not being improved any more, for example, in response to an error rate $\epsilon$ calculated by the evaluation section 220 converging to a predetermined value.

The weight data storing section 230 stores the weight of each feature. The weight of each feature stored in the weight data storing section 230 is updated by the weight updating section 225 while it is being learned. Then, the weight of each feature updated last in the weight data storing section 230 is read out by the hierarchical clustering section 215 at the time of operation as a determined weight of the feature.

Figure 4:
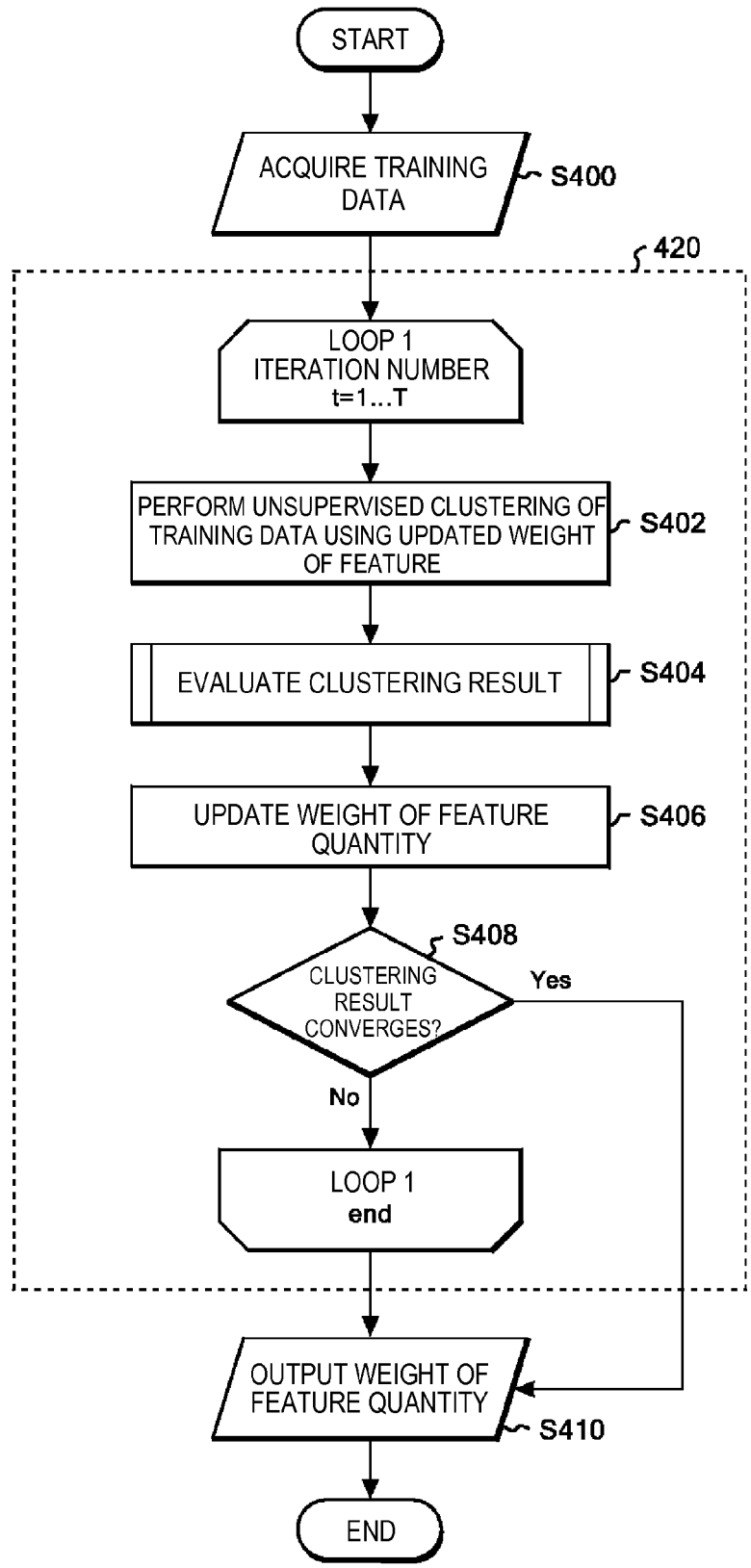
FIG. 4 is a flowchart showing the whole flow of a weight calculation process at the time of learning, according to the embodiment of the present invention.
Figure 5:
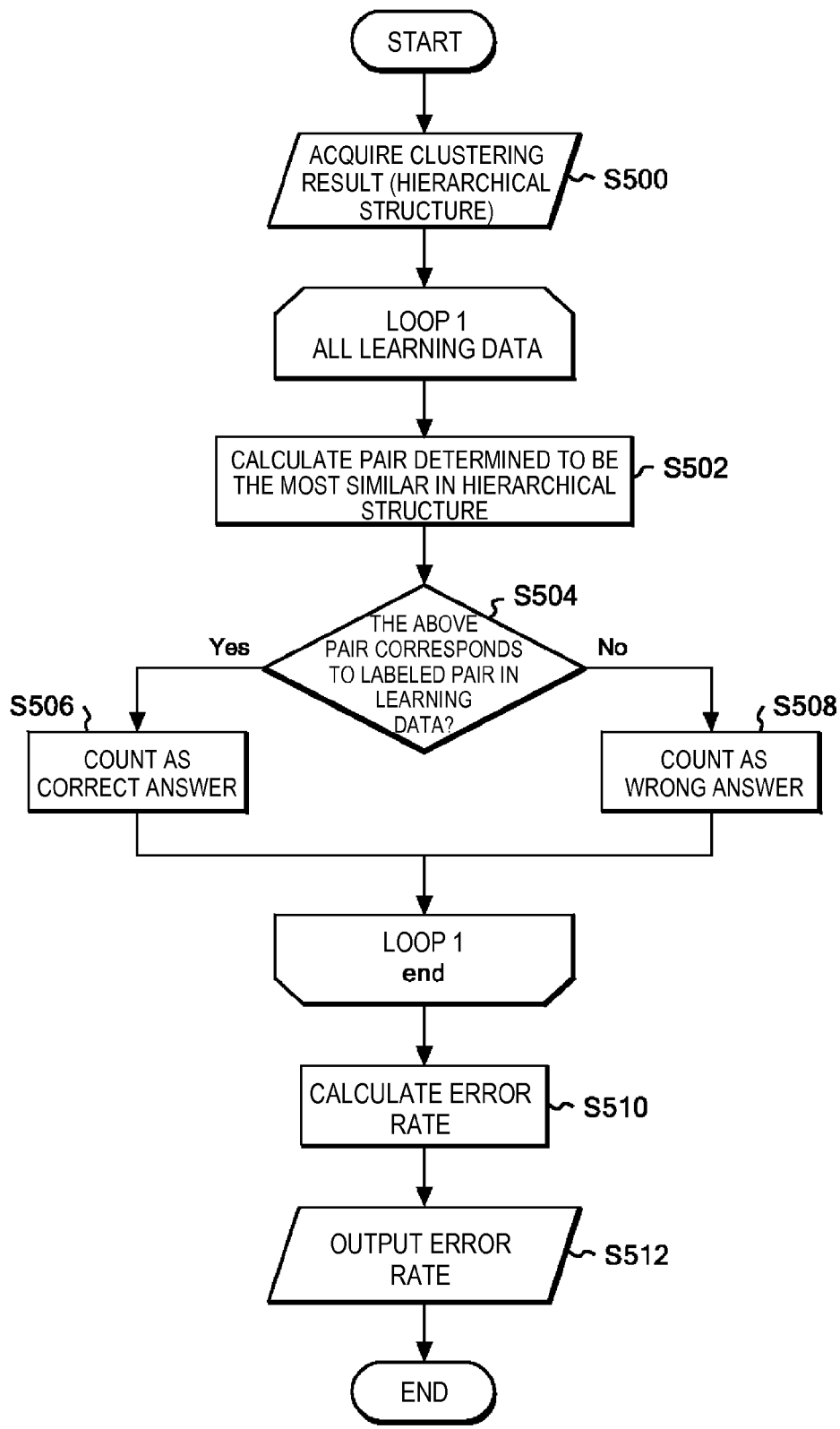
FIG. 5 is a flowchart showing the flow of a clustering result evaluation process according to the embodiment of the present invention.
Figure 6:
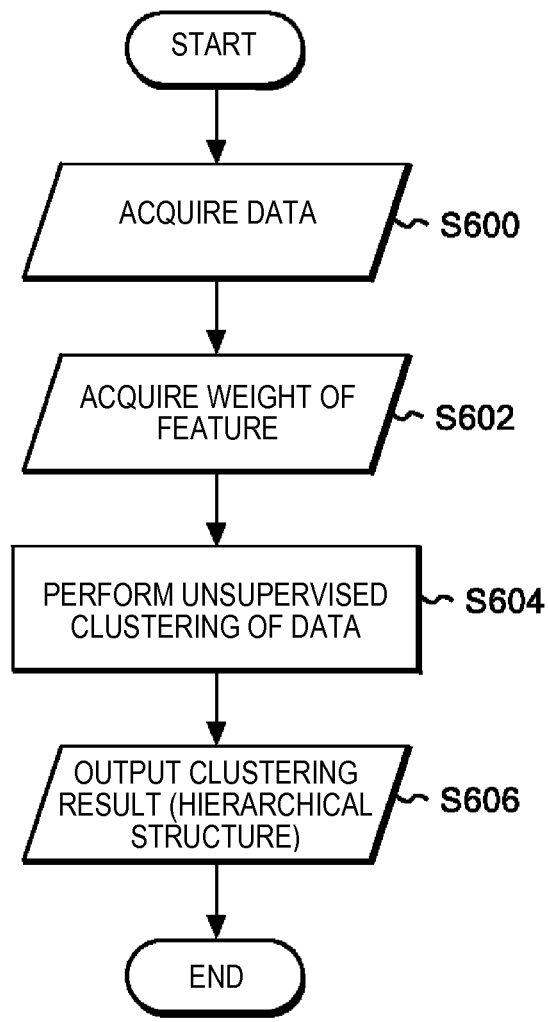
FIG. 6 is a flowchart showing the whole flow of a clustering process at the time of operation, according to the embodiment of the present invention.

Next, the process flow of a method for learning the weight of each feature according to the embodiment of the present invention will be described with reference to FIGS. 4 to 6. FIG. 4 is a flowchart showing the whole flow of a process for learning the weight of each feature according to the embodiment of the present invention. FIG. 5 is a flowchart showing the flow of a clustering result evaluation process according to the embodiment of the present invention. FIG. 6 is a flowchart showing the whole flow of a clustering process at the time of operation, according to the embodiment of the present invention.

The learning process shown in FIG. 4 starts at step 400, and the acquisition section 205 acquires multiple triplets together with label information as training data, the label information indicating a pair specified by the user as having the highest degree of similarity in a triplet. Then, a series of processings from step 402 to step 408 is repeated as a loop 1. It is assumed that an iteration number t begins with 1. The hierarchical clustering section 215 performs hierarchical clustering on training data using the current weight of each feature (step 402). Then, the evaluation section 220 evaluates a hierarchical structure, which is a result of the clustering, using label information about the triplet and determines an error rate $\epsilon$ (step 404). The details of the evaluation process will be described later with reference to FIG. 5.

Then, the weight updating section 225 refers to the label information to update the weight of each feature so that the degree of agreement between a pair combined first as being the same clusters in the triplet in the hierarchical structure, which is a result of the clustering, and a pair indicated by the corresponding label information increases (step 406). Then, by comparing the error rate $\epsilon$ determined by the evaluation section 220 with an error rate $\epsilon$ determined in the previous iteration t, the weight updating section 225 judges whether the clustering result is improved, that is, whether the clustering result has converged or not (step 408).

If the clustering result is judged not to have converged (step 408: NO), and the iteration number t is below T, the process returns to step 402, and learning of the weight of each feature by the loop 1 is continued. Here, T denotes the maximum value of the number of iterations, and, in general, it may be the total number of features. However, T may be a value equal to or above the total number of features, for example, twice the total number of features, in consideration of a possibility that the same feature is selected twice, though this will be described in detail later. On the other hand, if the clustering result is judged to have converged (step 408: YES) or if the iteration number t is equal to T, the process exits the loop 1 and proceeds to step 410. Then, the weight updating section 225 outputs the weight of each feature determined last as the learned weights of the feature. Then, the process ends. The output destination of the weight of each feature may be the weight data storing section 230.

The evaluation process shown in FIG. 5 starts at step 500, and the evaluation section 220 acquires a hierarchical structure, which is a result of clustering, from the hierarchical clustering section 215. Then, the evaluation section 220 repeats a series of processings from step 502 to step 506/508 for all training data as a loop 1. The evaluation section 220 determines a pair judged to be the most similar in the acquired hierarchical structure, in a triplet which is evaluation-target training data (step 502).

Next, the evaluation section 220 judges whether or not the pair determined at step 502 agrees with a pair indicated by corresponding label information stored in the label information storing section 210 (step 504). If the pairs correspond to each other (step 504: YES), the evaluation section increments the correct answer counter $C_s$ by one, making a judgment of a correct answer (step 506). On the other hand, if the pairs do not correspond to each other (step 504: NO), the evaluation section increments the wrong answer counter $C_f$ by one, making a judgment of a wrong answer (step 508). Both of the counters are assumed to be initialized with 0 when the evaluation process starts.

When the repetition of the loop 1 ends, the evaluation section 220 then calculates an error rate ϵ using the formula (4) described above and outputs it (steps 510 and 512). Then, the process ends.

The clustering process at the time of operation shown in FIG. 6 starts at step 600, and the acquisition section 205 acquires test data at the time of operation. Then, the hierarchical clustering section 215 acquires the learned weight of each feature, from the weight data storing section 230 (step 602). Then, the hierarchical clustering section 215 performs the same hierarchical clustering as the time of learning, on the test data using the weight of each feature which has been read out (step 604). Lastly, the hierarchical clustering section 215 outputs a hierarchical structure, which is a result of the clustering. Then, the process ends. The output destination of the hierarchical structure may be an output device such as a printer and a display of the weight learning apparatus 200 which are not shown in FIG. 2 or may be the storage section.

The series of processings by the hierarchical clustering section 215, the evaluation section 220 and the weight updating section 225 are a feedback loop as indicated by a rectangle 420 in FIG. 4. In the present invention, the weight of each feature is learned, with whether the whole hierarchical structure is good or bad as an evaluation criterion. As a method for updating the weight of each feature so that the degree of agreement between label information and a clustering-result hierarchical structure increases, multiple implementation methods are conceivable. These multiple implementation methods will be described below as a first example, a second example and a third example. In all the examples, the total number of triplets is denoted by N. The total number of features (the number of dimensions) is denoted by F, and a set of their indexes $S_F$ is defined by the following formula (5).
[Formula 5]

$$S_f = \{f | 1 \leq f \leq F\} \quad (5)$$

The feature of the index f will be hereinafter referred to as a feature f for convenience.

3. Learning Method

3-1. FIRST EXAMPLE

In update of the weight of each feature according to a first example, a feature which causes disagreement between label information and a clustering-result hierarchical structure is determined, and the weight of the feature is updated on the basis of the determination. A specific procedure is as shown below. Processings of 2. to 6. shown below are repeated until the clustering result is not improved any more. A round t indicates what number each repetition is.

1. The weights $w_f$ of all features are initialized with 1/F.
2. Hierarchical clustering is executed for sets-of-three-pieces-of-content training data using the weights $w_f$ of the features in the current round t. Here, the hierarchical clustering may be executed in the Ward's method using the formula (3).
3. A clustering result is evaluated for each triplet. Specifically, it is judged, for each triplet, whether or not a clustering result and label information correspond to each other, and an error rate ϵ is calculated with the use of the formula (4) described above.
4. For each of such triplets that it is judged that a clustering result and label information do not correspond to each other in the evaluation of 3. (hereinafter referred to as a triplet in disagreement, for convenience), a feature presumed to be the cause of the disagreement is determined.

As an example, the feature presumed to be the cause of the disagreement is such a feature that difference between the values of the feature of a pair indicated by label information corresponding to the triplet in disagreement is relatively large in comparison with difference between the values of the corresponding feature of the other pairs in the same triplet in disagreement. There is a possibility that there are multiple features presumed to be the cause of the disagreement.

5. The weight of each feature is updated so that the weight of the feature determined as the cause of the disagreement is smaller than the weights of the other features. As an example, only the weight of the feature determined as the cause of the disagreement may be a constant times decreased. On the contrary, only the weights of features which are not determined as the cause of the disagreement may be a constant times increased. Alternatively, the update may be performed so that the weight of the feature determined as the cause of the disagreement is decreased, and the weights of the other features are increased.
6. Normalization is performed so that the sum of the weights of all the features is 1.

The processings of 1., and 4. to 6., the processing of 2. and the processing of 3. are executed by the weight updating section 225, the hierarchical clustering section 215 and the evaluation section 220, respectively.

Figure 7:
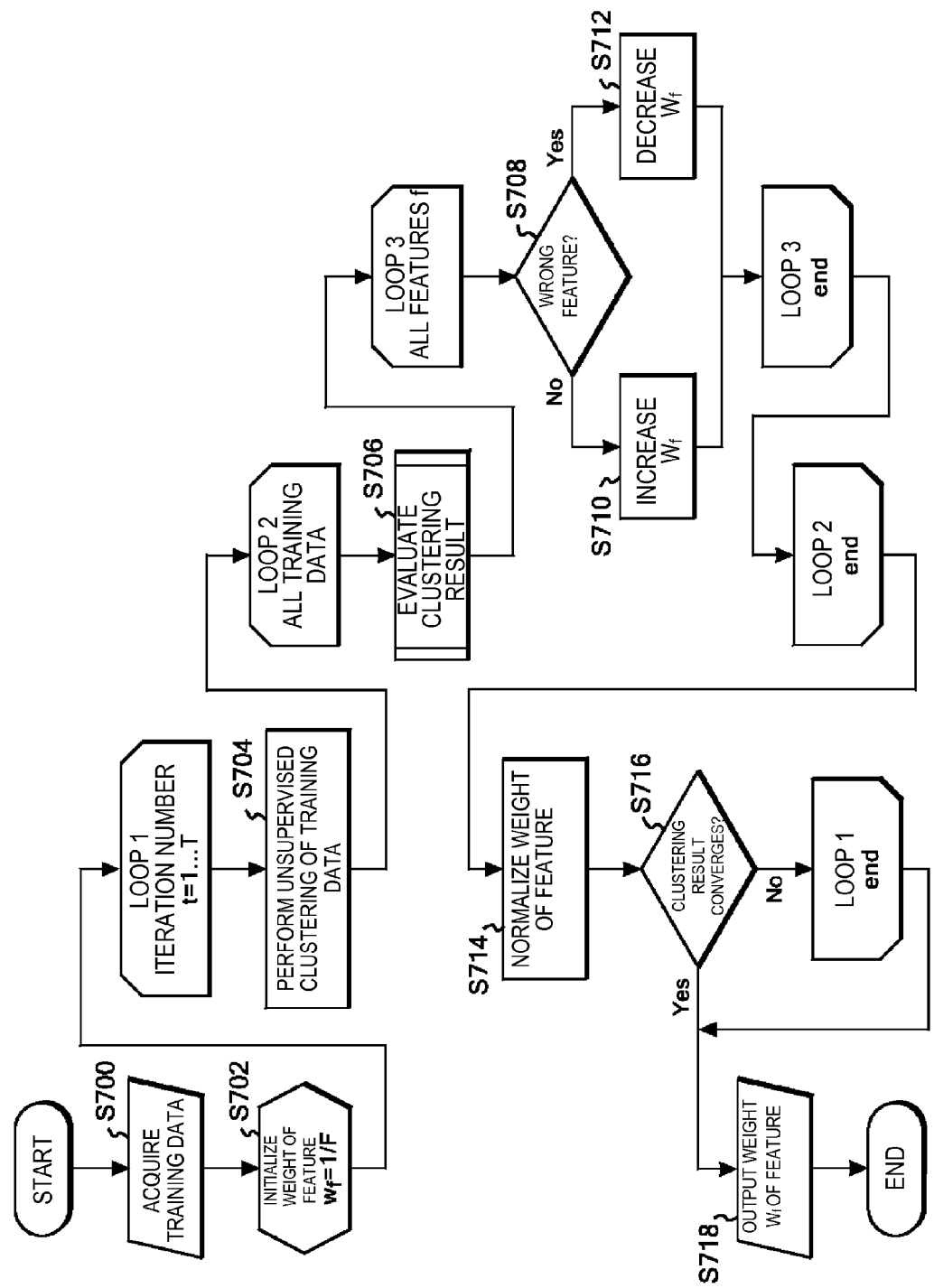
FIG. 7 is a flowchart showing the flow of a weight calculation process at the time of learning, according to a first example of the present invention.

Next, the flow of a weight calculation process at the time of learning according to the first example will be described with reference to FIG. 7. The weight calculation process shown in FIG. 7 starts at step 700, and the acquisition section 205 acquires sets-of-three-pieces-of-content training data. Then, the weight updating section 225 initializes the weights $w_f$ of all features to 1/F (step 702). Then, a series of processings from step 704 to step 716 is repeated as a loop 1. It is assumed that an iteration number t begins with 1. The hierarchical clustering section 215 performs hierarchical clustering on the training data using the current weight $w_f$ of each feature (step 704).

Then, a series of processings from step 706 to step 712 is repeated for all the training data as a loop 2. The evaluation section 220 evaluates a clustering result (step 706). Since the details of the evaluation process have been already described with reference to FIG. 5, description thereof will be omitted here. Then, a series of processings from step 708 to step 712 is repeated for all the features f as a loop 3. For each of triplets regarded as triplets in disagreement as a result of the evaluation, the weight updating section 225 determines a feature presumed to be the cause of the disagreement, and judges whether or not the current feature f is the wrong feature presumed to be the cause of the disagreement (step 708). If the current feature f is not the wrong feature (step 708: NO), the weight updating section 225 increases the weight $w_f$ of the feature f (step 710). On the other hand, if the current feature f is the wrong feature (step 708: YES), the weight updating section 225 decreases the weight $w_f$ of the feature f (step 712).

Then, when the repetition of the loop 3 and the loop 2 ends, the process proceeds to step 714, and the weight updating section 225 normalizes the weight $w_f$ of each feature. Then, the weight updating section 225 judges whether the clustering result has converged or not. As described above, such judgment may be done by confirming that the error rate ϵ calculated by the evaluation section 220 has converged to a predetermined value. If the clustering result has not converged (step 714: NO) and the iteration number t is below T, the process returns to step 704, and the series of processings of the loop 1 is repeated. Here, T denotes the maximum value of the number of iterations, and, as an example, it may be the total number of features F. On the other hand, if the clustering result has converged (step 714: YES) or if the iteration number t is equal to T, the process exits the loop 1 and proceeds to step 718, and the weight updating section 225 outputs the weight $w_f$ of each feature. Then, the process ends.

3-2. SECOND EXAMPLE

In update of the weight of each feature according to a second example, a weight is attached to each triplet, and the weight is updated with the use of an AdaBoost data weight calculation formula for a feature as a weak classifier. A specific procedure is as shown below. A series of processings from 2. to 5. is repeated the number of times corresponding to the number of features F. A round t indicates what number each repetition is.

1. The weight $D_i$ of each triplet is initialized to 1/N. Here, $D_i$ denotes the weight of the i-th triplet.
2. For each feature f, hierarchical clustering on weighted triplets is executed with the use of only the feature f. Here, the hierarchical clustering may be executed in the Ward's method using the formula (3). However, only the weight $w_f$ of the feature f takes 1, and all the values of the other weights are 0. The values of the features of each piece of content in the i-th triplet are multiplied by the weight $D_i$.
3. A clustering result for each feature f is evaluated with the use of each triplet and its weight. Specifically, as defined by the following formula (6), a weighted error rate $\epsilon_f$ for each feature f is calculated in consideration of the weight $D_i$ of each triplet.

[Formula 6]

$$\varepsilon_f = \sum_i D_i \times I_i(\text{fail}) \tag{6}$$

$I_i$(fail): Function which takes the value of 1 if the i-th set of three pieces of content is a wrong answer and takes the value of 0 if it is a correct answer That the i-th triplet is a correct answer means that, in a hierarchical structure which is a result of clustering performed with the use of only the feature f, a pair combined first in the i-th triplet and a pair indicated by label information about the i-th triplet correspond to each other. On the contrary, that the i-th triplet is a wrong answer means that the pair combined first in the i-th triplet and the pair indicated by the label information about the i-th triplet do not correspond to each other.

4. The feature f having the lowest weighted error rate $\epsilon_f$ in the evaluation of 3. is adopted as a weak classifier $f_t$ in the current round t. Then, for the weight $w_{ft}$ of the feature $f_t$ is calculated with the use of the lowest weighted error rate $\epsilon_{ft}$, as shown in the following formula (7).

[Formula 7]

$$w_{ft} = \frac{1}{2} \log \left\{ \frac{1 - \varepsilon_{ft}}{\varepsilon_{ft}} \right\} \tag{7}$$

5. The weight $D_i$ of each triplet is updated by the AdaBoost data weight calculation formula on the basis of whether its clustering result is correct or wrong. Specifically, as shown in the following formulas (8) and (9), the weight $D_i$ of each triplet is updated with the weight $w_{ft}$ of the feature $f_t$ determined as the weak classifier $f_t$ so that the weights of such triplets that a clustering result and label information do not correspond to each other are larger than the weights of such triplets that a clustering result and label information correspond to each other.

[Formula 8]

$$d_i = \begin{cases} D_i \times \exp(+w_{ft}) & \text{if } I_i(\text{fail}) > 0 \\ D_i \times \exp(-w_{ft}) & \text{otherwise} \end{cases} \tag{8}$$

[Formula 9]

$$D_i \leftarrow \frac{d_i}{\sum_i d_i} \tag{9}$$

The processings of 1., 4. and 5., the processing of 2. and the processing of 3. are executed by the weight updating section 225, the hierarchical clustering section 215 and the evaluation section 220, respectively. For the details of the AdaBoost algorithm, see, for example, "A decision-theoretic generalization of on-line learning and an application to boosting," by Yoav Freund and Robert E Schapire, Journal of the Computer and System Sciences, pp. 119-139, 1997.

Figure 8:
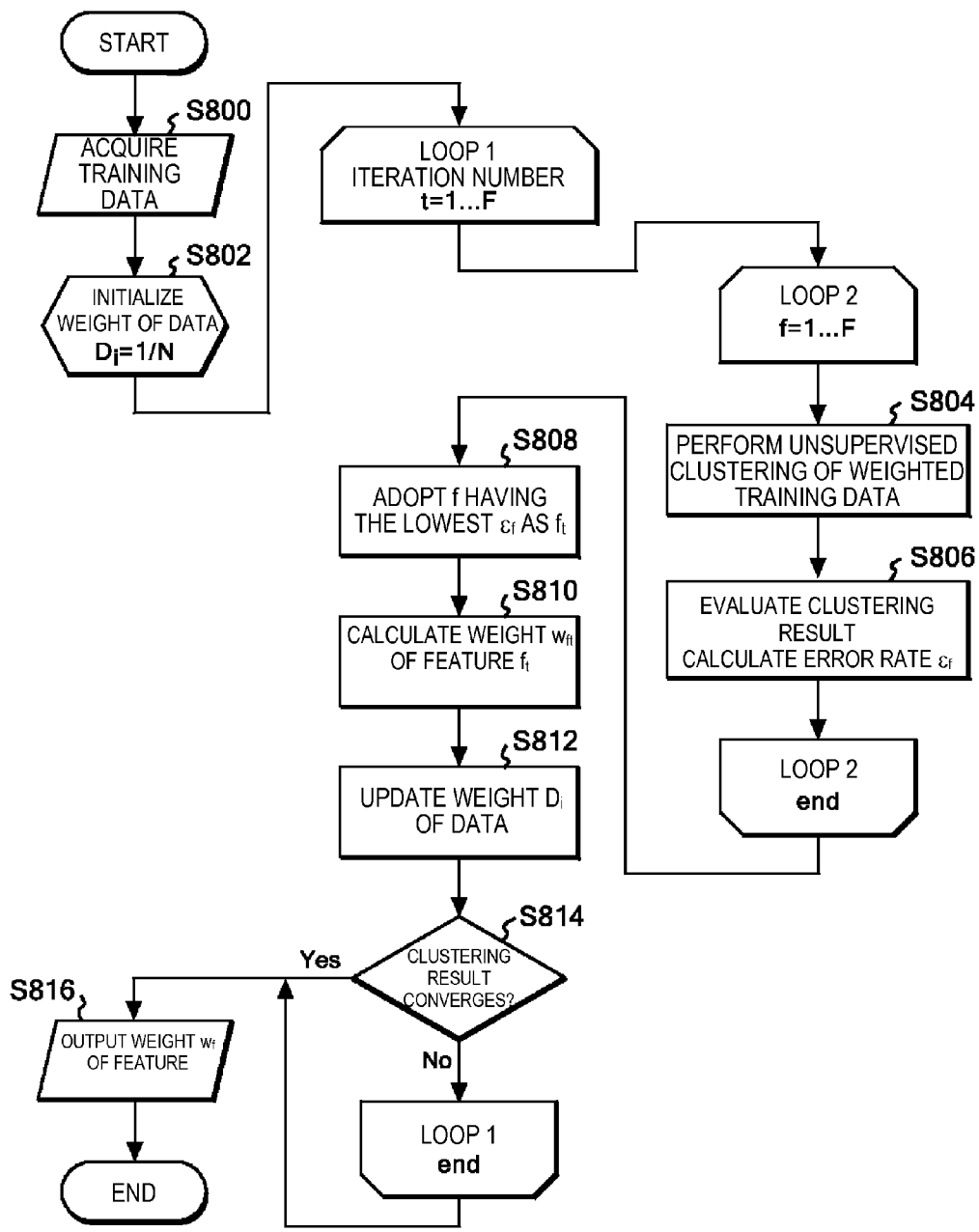
FIG. 8 is a flowchart showing the flow of a weight calculation process at the time of learning, according to a second example of the present invention.

Next, the flow of a weight calculation process at the time of learning according to the second example will be described with reference to FIG. 8. The weight calculation process shown in FIG. 8 starts at step 800, and the acquisition section 205 acquires sets-of-three-pieces-of-content training data. Then, the weight updating section 225 initializes the weights $D_i$ of all triplets to 1/N (step 802). Then, a series of processings from step 804 to step 814 is repeated the number of times corresponding to the number of features F as a loop 1. It is assumed that an iteration number t of the loop 1 begins with 1. In the loop 1, processings of step 804 and step 806 are repeated the number of times corresponding to the number of features F as a loop 2. It is assumed that an index f of the current feature begins with 1.

The hierarchical clustering section 215 performs hierarchical clustering on weighted training data using only the current feature f (step 804). Then, the evaluation section 220 evaluates a result of the clustering of step 804 and calculates a weighted error rate $\epsilon_f$ for the feature f by the above formula (6) (step 806).

When the repetition of the loop 2 ends, the process proceeds to step 808, where the weight updating section 225 determines a feature f the weighted error rate $\epsilon_f$ of which is the lowest as a weak classifier $f_t$ in the current round t. Then, the weight updating section 225 determines the weight $w_{ft}$ of the feature $f_t$ determined as the weak classifier at step 808, by the above formula (7) (step 810). Then, the weight updating section 225 updates the weight $D_i$ of each triplet by the above formulas (8) and (9) (step 812). Then, the weight updating section 225 judges whether the clustering result has converged or not by judging whether the lowest weighted error rate $\epsilon_f$ determined at step 808 converges to a predetermined value or not (step 814). More specifically, if the lowest weighted error rate $\epsilon_f$ is not within the predetermined value, it is judged that the clustering result has converged. The reason is that, since the accuracy of a feature f selected later as a weak classifier $f_t$ is considered to be worse, the loop 1 is exited at the time when the predetermined value is exceeded. Instead, it is also possible to perform hierarchical clustering using all the features $f_t$ obtained in the previous iterations (1, . . . , t) and their weights $w_{ft}$, evaluate the accuracy of the hierarchical clustering, and exit the loop 1 in response to the accuracy not being improved any more. The judgment method is favorable because it uses a combination of weights of features which are to be actually outputted, for convergence determination.

If the clustering result does not converge (step 814: NO) or if the loop 1 has not been repeated the number of times corresponding to the number of features F, the process returns to step 804, and the weight learning process of the loop 1 is continued. On the other hand, if the clustering result has converged (step 814: YES) or if the loop 1 has been repeated the number of times corresponding to the number of features F, the process exits the loop 1 and proceeds to step 816. The weight updating section 225 outputs the weight $w_{f_t}$ of the feature $f_t$ determined at step 810 in each round t as the learned weight $w_f$ of each feature. Then, the process ends.

3-3. THIRD EXAMPLE

Update of the weight of each feature according to a third example is the update of the weight of each feature according to the second example which has been improved. In the update of the weight of each feature according to the second example, it is only the weight $w_{f_t}$ of the feature $f_t$ determined as a weak classifier that is calculated in each round t of learning repeated the number of times corresponding to the number of features F. However, it is not necessarily true that a different feature f is determined as a weak classifier in each round t. That is, the same feature f may be determined as a weak classifier multiple times. In this case, the value calculated in the previous round t is overwritten, and the information is lost. Therefore, in the third example, the number of repetitions is not limited to the number of features F, and, as the weight of each feature determined finally, the sum of the weights of the feature calculated in each round t is used. A specific procedure is as shown below. A series of processings from 2. to 5. shown below is repeated until the clustering result is not improved any more. A round t indicates what number each repetition is.

1. The weight $D_i$ of each triplet is initialized to 1/N. Here, $D_i$ denotes the weight of the i-th triplet.
2. For each feature f, hierarchical clustering on weighted triplets is executed with the use of only the feature f. Here, the Ward's method using the formula (3) can be used for the hierarchical clustering. However, only the weight $w_f$ of the feature f takes 1, and all the values of the other weights are 0. The values of the features of each piece of content in the i-th triplet is multiplied by the weight $D_i$ of the triplet.
3. A clustering result for each feature f is evaluated with the use of each triplet and its weight. Specifically, as defined by the above formula (6), a weighted error rate $\epsilon_f$ for each feature f is calculated in consideration of the weight $D_i$ of each triplet. That the i-th triplet is a correct answer means that, in a hierarchical structure which is a result of clustering performed with the use of only the feature f, a pair combined first in the i-th triplet and a pair indicated by label information about the i-th triplet correspond to each other. On the contrary, that the i-th triplet is a wrong answer means that the pair combined first in the i-th triplet and the pair indicated by the label information about the i-th triplet do not correspond to each other.
4. The feature f having the lowest weighted error rate $\epsilon_f$ in the evaluation of 3. is adopted as a weak classifier $f_t$ in the current round t. Then, for the feature $f_t$, its temporary weight $\alpha_t$ is calculated with the use of the lowest weighted error rate $\epsilon_{f_t}$ as shown in the following formula (10).

[Formula 10]

$$\alpha_t = \frac{1}{2}\log\left\{\frac{1-\varepsilon_{f_t}}{\varepsilon_{f_t}}\right\} \quad (10)$$

5. The weight $D_i$ of each triplet is updated by the AdaBoost data weight calculation formula on the basis of whether its clustering result is correct or wrong. Specifically, as shown in the following formulas (11) and (12), the weight $D_i$ of each triplet is updated with the temporary weight $\alpha_t$ of the feature $f_t$ determined as the weak classifier $f_t$ so that the weights of such triplets that a clustering result and label information do not correspond to each other are larger than the weights of such triplets that a clustering result and label information correspond to each other.

[Formula 11]

$$d_i = \begin{cases} D_i \times \exp(+\alpha_t) & \text{if } I_i(\text{fail}) > 0 \\ D_i \times \exp(-\alpha_t) & \text{otherwise} \end{cases} \quad (11)$$

[Formula 12]

$$D_i \leftarrow \frac{d_i}{\sum_i d_i} \quad (12)$$

6. When the clustering result is not improved any more, and the series of processings from 2. to 5. ends, the weight $w_f$ of each feature f is determined by the following formula (13).

[Formula 13]

$$w_f = \sum_i \alpha_t \delta_{f_t,f} \quad (13)$$

This is a function returning 1 if $\delta_{f_t,f}$:$f_t$=f is satisfied, and, otherwise, returning 0.

The processings of 1., 4., 5. and 6., the processing of 2. and the processing of 3. are executed by the weight updating section 225, the hierarchical clustering section 215 and the evaluation section 220, respectively.

Figure 9:
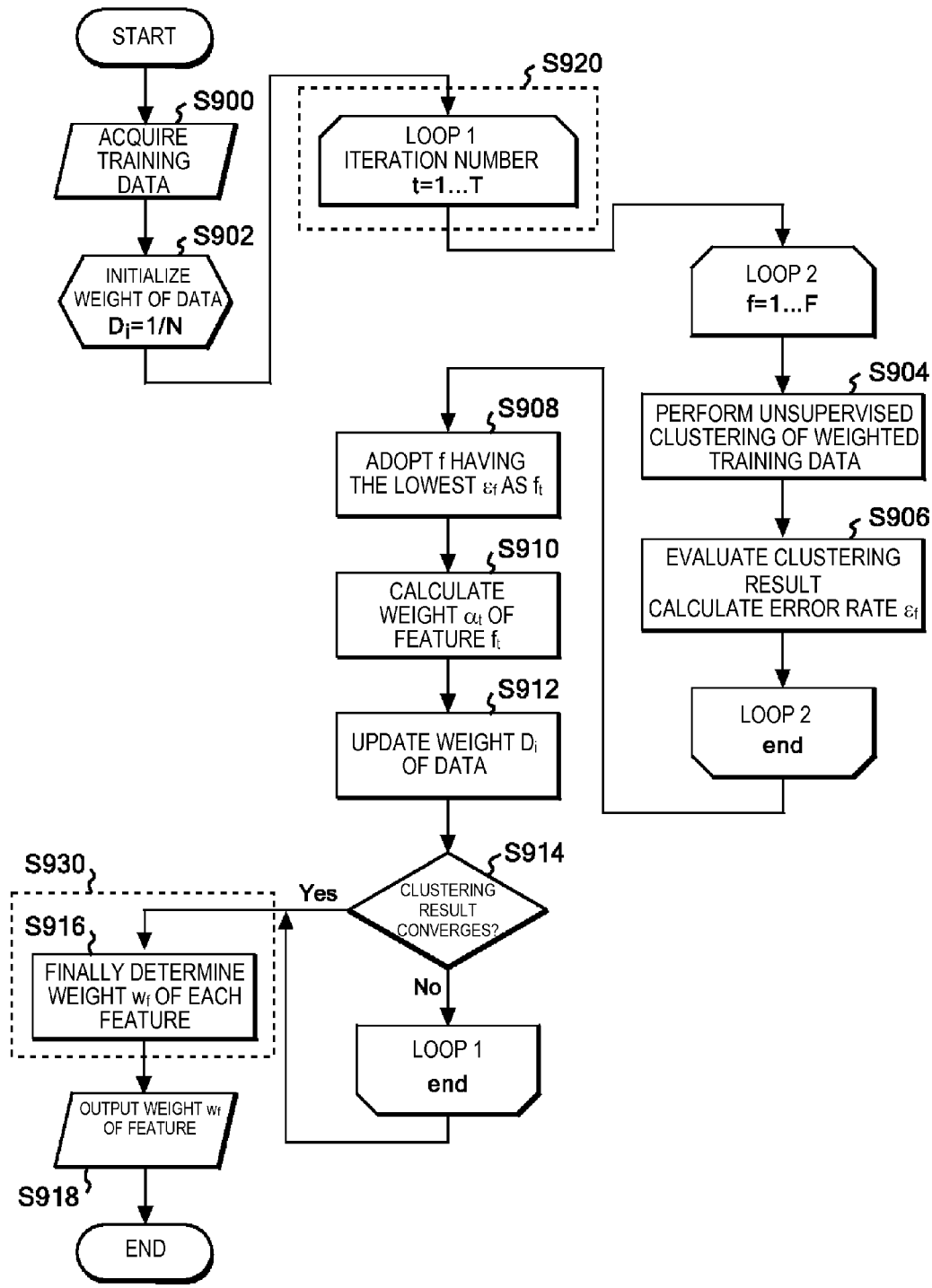
FIG. 9 is a flowchart showing the flow of a weight calculation process at the time of learning, according to a third example of the present invention.

Next, the flow of a weight calculation process at the time of learning according to the third example will be described with reference to FIG. 9. In FIG. 9, parts surrounded by rectangles 920 and 930 indicate parts which are different from the learning according to the second example. The weight calculation process shown in FIG. 9 starts at step 900, and the acquisition section 205 acquires sets-of-three-pieces-of-content training data. Then, the weight updating section 225 initializes the weights $D_i$ of all triplets to 1/N (step 902). Then, a series of processings from step 904 to step 914 is repeated as a loop 1. It is assumed that an iteration number t of the loop 1 begins with 1. In the loop 1, processings of steps 904 and 906 are repeated the number of times corresponding to the number of features F as a loop 2. It is assumed that an index f of the current feature begins with 1.

The hierarchical clustering section 215 performs hierarchical clustering on the weighted training data using the current feature f (step 904). Then, the evaluation section 220 evaluates a result of the clustering of step 904 and calculates a weighted error rate $\epsilon_f$ for the feature f by the above formula (6) (step 906).

When the repetition of the loop 2 ends, the process proceeds to step 908, where the weight updating section 225 determines a feature f the weighted error rate $\epsilon_f$ of which is the lowest as a weak classifier $f_t$ in the current round t. Then, the weight updating section 225 determines a temporary weight $\alpha_t$ of the feature $f_t$ determined as the weak classifier at step 908, by the above formula (10) (step 910). Then, the weight updating section 225 updates the weight $D_i$ of each triplet with the temporary weight $\alpha_t$ by the above formulas (11) and (12) (step 912). Then, the weight updating section 225 judges whether the clustering result has converged or not by judging whether the lowest weighted error rate $\epsilon_f$ determined at step 908 converges to a predetermined value or not (step 914). More specifically, if the lowest weighted error rate $\epsilon_f$ is not within the predetermined value, it is judged that the clustering result has converged. The reason is that, since the accuracy of a feature f selected later as a weak classifier $f_t$ is considered to be worse, the loop 1 is exited at the time when the predetermined value is exceeded, as described above about the second example. Instead, it is also possible to, for each of all the features $f_t$ obtained in the previous iterations (1, . . . , t), perform hierarchical clustering using the sum of the temporary weights $\alpha_t$ of the feature as the weight of the feature $f_t$, evaluate the accuracy of the hierarchical clustering, and exit the loop 1 in response to the accuracy not being improved any more. The judgment method is favorable because it uses a combination of weights of features which are to be actually outputted, for convergence determination.

If the clustering result does not converge (step 914: NO) or if the iteration number is below T, the process returns to step 904, and the weight learning process of the loop 1 is repeated. Here, T is the maximum value of the number of iterations, and it takes a value larger than the total number of features F, such as 2F, twice the total number of features F. On the other hand, if the clustering result has converged (step 914: YES) or if the iteration number is equal to T, the process exits the loop 1 and proceeds to step 916, and the weight updating section 225 determines the weight $w_t$ of each feature f by the above formula (13) and outputs it. Then, the process ends.

4. Calculation of the Weight of Features According to the Number of Clusters Next, a process for changing the weight of a feature according to the number of clusters will be described. A feature which a person pays attention to differs between the case of a hierarchical layer having a lot of clusters and the case of a hierarchical layer having a few clusters. That is, in the case of performing rough classification (corresponding to a hierarchical layer having a few clusters), the person performs the classification paying attention only to a small number of features. For example, the case of judging the brightness of voice only on the basis of whether the fundamental frequency is high or low comes under this case. On the other hand, in the case of performing detailed classification (corresponding to a hierarchical layer having a lot of clusters), the person performs the classification by making a judgment as a whole on the basis of various features. For example, the case of performing classification on the basis of the fundamental frequency, power, and a speaker's confidence delicately expressed through all the length of duration comes under this case.

In the present invention, only the weight of a feature corresponding to the level of the degree of abstractness is calculated in order to reflect the nature of the degree of similarity.

Figure 10:
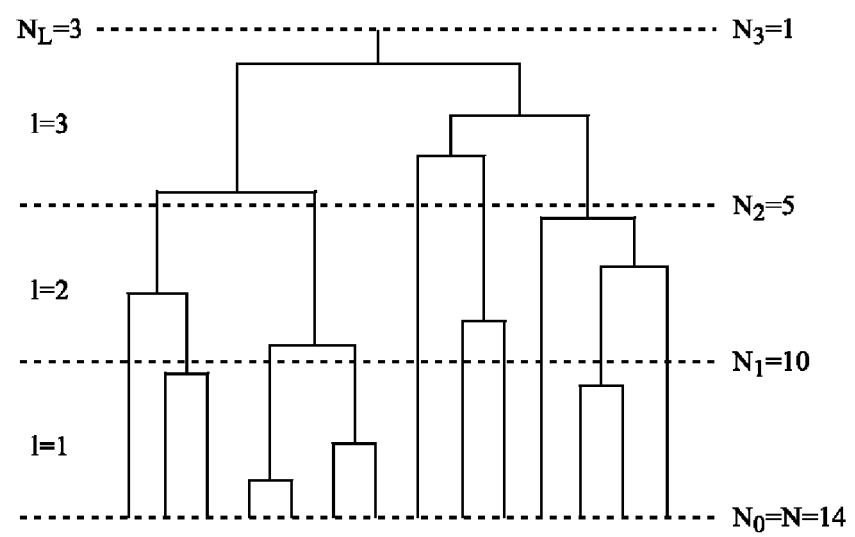
FIG. 10 is a diagram illustrating numbering of levels and an upper limit of the number of clusters for each level, in the embodiment of the present invention.

Symbols to be used will be described first. The total number of levels is denoted by $N_L$, and the number of clusters at the upper end of the first level is denoted by $N_l$. In this case, $N_0=N$ (N denotes all leaning data and indicates not the number of triplets but the number of individual samples) and $N_l < N_{l-1}$ are satisfied. The level l is defined as a range in which the number of clusters at the lower end is $N_{l-1}$, and the number of clusters at the upper end is $N_l$. FIG. 10 shows a specific example of the above symbols in a hierarchical structure having three levels. A specific procedure will be described below.

1. The number $N_0$ of training data and the number of clusters $N_l$ ($1 \le l \le N_L$) at the upper end of each level are acquired. The iteration number l corresponding to each level begins with 1, and it is incremented by one after the processing of 3.
2. The weight of each feature is learned in any of the methods of the first to third examples described above with the number $N_{l-1}$ of clusters as training data. The weights are the weights of features for a hierarchical layer l (the number of clusters: from $N_{l-1}$ to $N_l$).
3. The same hierarchical clustering as used in 2. is performed in a bottom-up method using the weight of each feature determined immediately previously until the number of clusters reaches $N_l$.
4. The above 2. and 3. are repeated the number of times corresponding to the number of levels $N_l$ for which the weights are to be switched.

The processing of 1., a part of the processing of 2., a part of the processing of 2. and the processing of 3., and a part of the processing of 2. are executed by the acquisition section 205, the weight updating section 225, the hierarchical clustering section 215, and the evaluation section 220, respectively.

Figure 11:
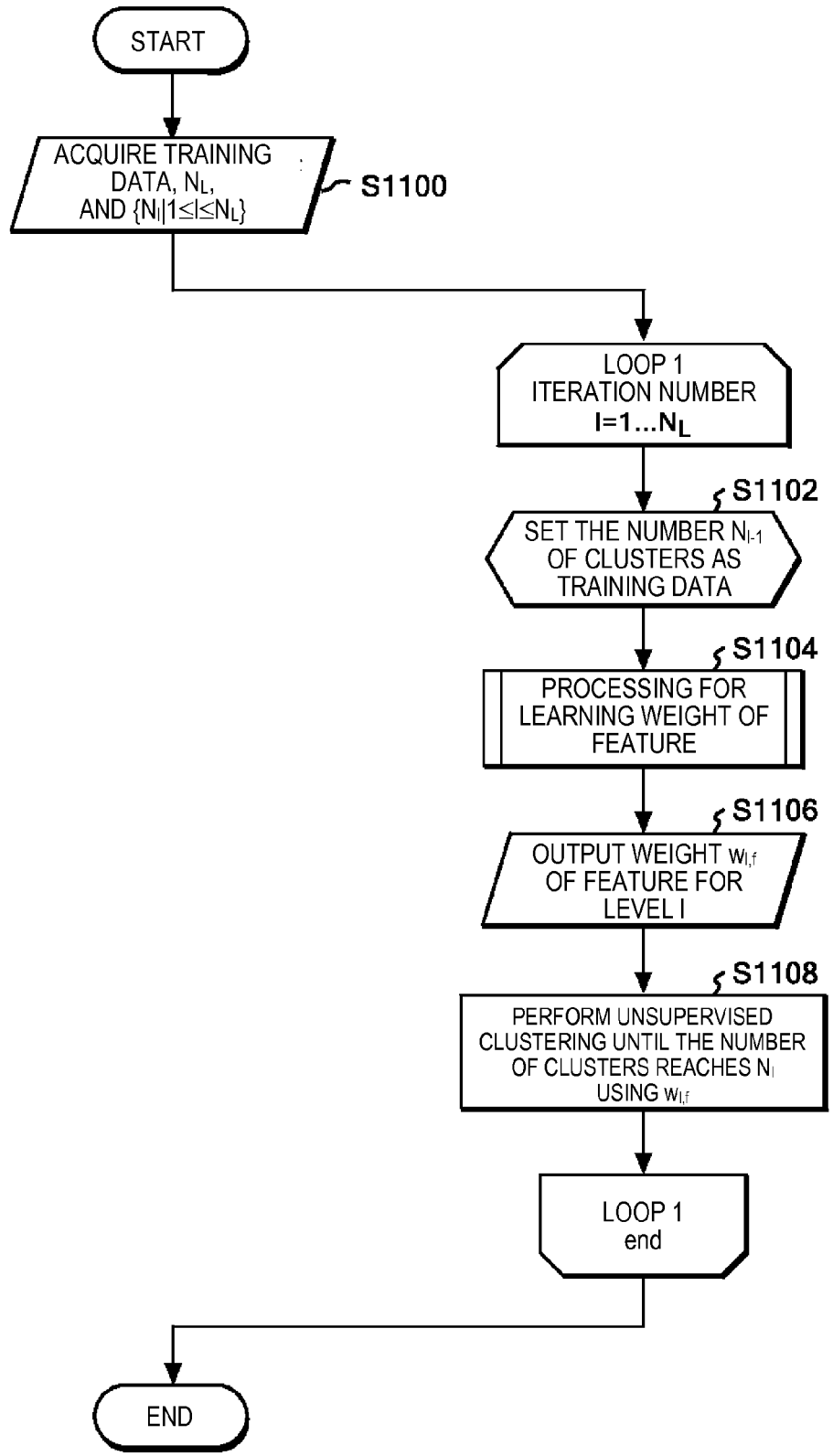
FIG. 11 is a flowchart showing the flow of a process for changing the weight of a feature for each level according to the embodiment of the present invention.

Next, the flow of a process for changing the weights of features for each hierarchical layer will be described with reference to FIG. 11. The weight calculation process shown in FIG. 11 starts at step 1100, and the acquisition section 205 acquires training data including the number $N_0$ of pieces of content and the number of clusters $N_l$ ($1 \le l \le N_L$) at the upper end of each level. Here, $N_L$ denotes the total number of levels.

Then, a series of processings from step 1102 to step 1108 is repeated as a loop 1. It is assumed that an iteration number 1 of the loop 1 begins with 1. The weight updating section 225, the hierarchical clustering section 215 and the evaluation section 220 set the $N_{l-1}$ of clusters as training data (step 1102), learn the weight of each feature in any of the method of the first to third examples described above (step 1104), and set the determined weight $w_{l,f}$ of each feature as the weight of each feature for the level l (step 1106).

Then, the hierarchical clustering section 215 performs the same hierarchical clustering as used at step 1104 in a bottom-up method using the weight $w_{l,f}$ of each feature determined immediately previously until the number of clusters reaches $N_l$ (step 1108). When the above series of processings ends for the iteration number $l=N_L$, the process exits the loop 1 and ends.

5. APPLICATION EXAMPLE

According to the learning method of the present invention, by using the learned weight of each feature, it is possible to perform clustering so that degrees of subjective similarity among pieces of emotional content that a person feels can be reflected. As an example, such clustering is effective in monitoring at a call center. In this case, it is possible to detect change in feelings of an agent (operator) and a caller (customer). In addition, it is conceivable to apply the present invention to detection of crimes such as a fraud and to the psychiatric care field, but it goes without saying that the present invention is not limited thereto.

Figure 12:
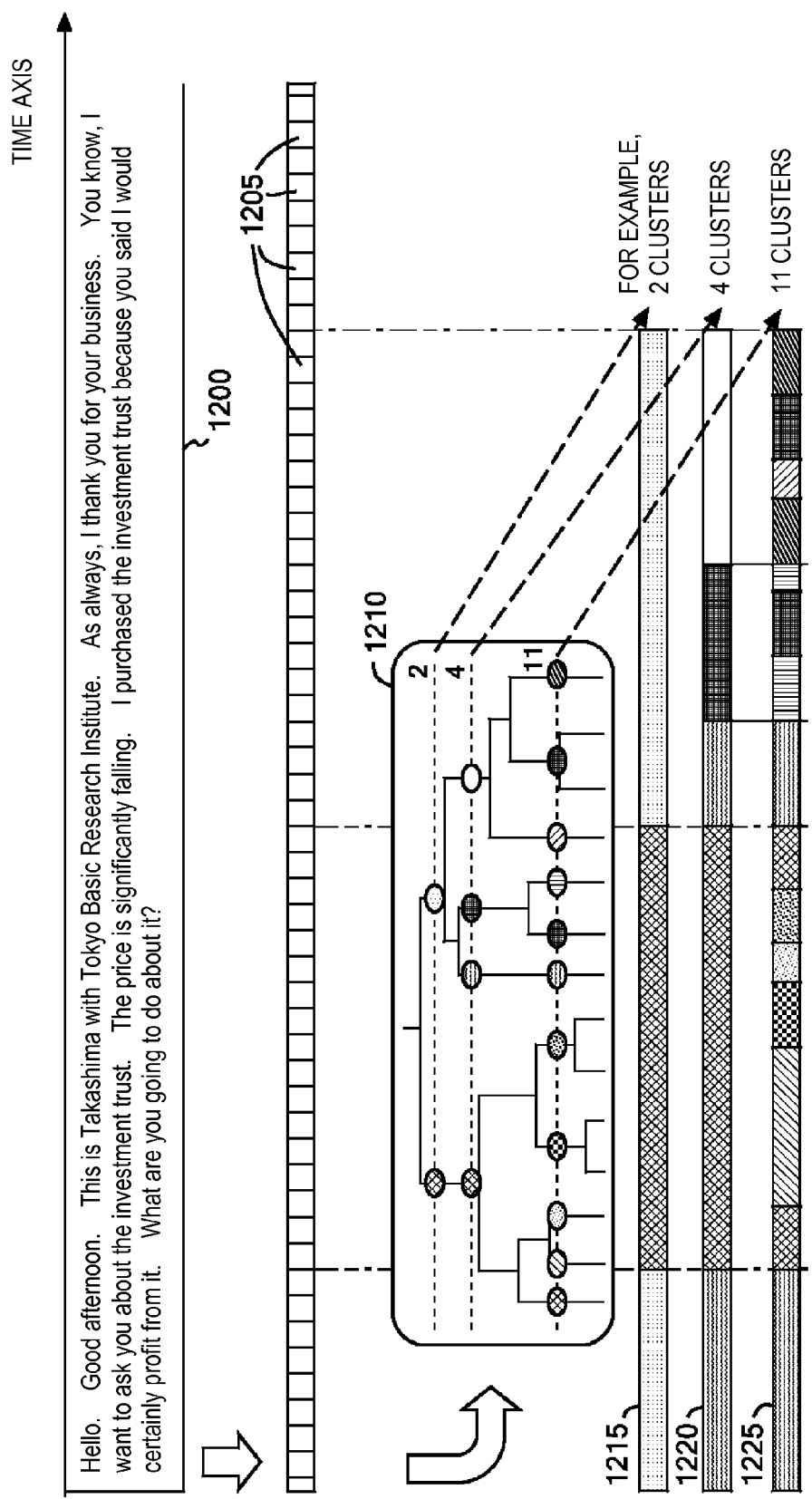
FIG. 12 is a diagram illustrating a clustering result display method according to the embodiment of the present invention.

FIG. 12 illustrates a method for displaying a telephone-voice clustering result according to the embodiment of the present invention. A clustering result 1210 shown in FIG. 12 is obtained as a result of dividing a telephone voice (one long WAV file) 1200 into multiple segments 1205, which are sentences or phrases, at breathing or silent positions and performing hierarchical clustering using the weight of each feature learned by the learning method of the present invention, with the multiple segments 1205 as test data.

A hierarchical structure, which is the clustering result 1210, can be immediately outputted to an output device such as a display and a printer. Furthermore, it is also possible to acquire a specification of a hierarchical layer to be displayed, from the user, and display test data classified into the number of clusters of the specified hierarchical layer. For example, if a hierarchical layer having two clusters in the clustering result 1210 is specified by the user, a clustering result 1215 is displayed. Similarly, when a hierarchical layer having four clusters is specified by the user, a clustering result 1220 is displayed, and, when a hierarchical layer having 11 clusters is specified, a clustering result 1225 is displayed. When multiple hierarchical layers are selected, classification results corresponding to them may be displayed at the same time so that they can be compared with one another.

In the clustering results 1215, 1210 and 1225 shown in FIG. 12, segments with the same pattern are uttered in similar feelings. By paying attention to a boundary at which a pattern changes as a temporal position at which a feeling changes, it is possible to find a trigger of change in feeling. By adopting the above display method, the user can observe transition of a speaker's feeling, interactively changing the degree of granularity of emotional analysis.

6. EXPERIMENTAL RESULT

An experimental result of the present invention will be described with reference to FIG. 13. Experimental conditions are as follows:

1. Test data

Utterance of "So-desu-ne (I see)" by one female speaker; 34 samples (Three evaluators)×(250 sets in ABC format)=750 sets 2. Training data Utterance of "So-desu-ne" by the same speaker; 33 samples different from test data (Three evaluators)×(100 sets in ABC format)=300 sets 3. Feature Sixteen dimensions The utterance "So-desu-ne" is divided into "So", "desu" and "ne", and the length of duration is calculated for each segment.

The fundamental frequency, power, an HNR (Harmonics-to-Noise Ratio) and an average of their deltas for each of "So" and "ne" are used. Because the fundamental frequency of "desu" is unstable, "desu" is not used.

4. Comparison method

A. Unsupervised hierarchical clustering without the weight of each feature

B. Hierarchical clustering using PCA (Principal Component Analysis)

Training data is not used.

A projection matrix is created from training data by PCA to project test data.

C. Forward selection method

Training data is used.

Starting with the 0-th dimensional feature vector, only such features that improve the clustering result are sequentially added until the accuracy is not improved any more.

D. Third example of the present invention

Training data is used.

In both of the methods C and D, among the above methods, hierarchical clustering is performed with the use of the weight of each feature determined on the basis of evaluation of a hierarchical structure, which is a result of the hierarchical clustering, and both methods correspond to the hierarchical clustering of the present invention. As for the methods C and D, two experiments were conducted in a method of using the weight of each feature which is common to all the numbers of clusters and in a method of changing the weight of the features according to the number of clusters. The switching of the weight of each feature is determined by trial and error. In the method C, the switching is performed once at a hierarchical layer having five clusters. In the method D, the switching is performed twice at hierarchical layers having seven clusters and three clusters, respectively.

The numerical values shown in the table in FIG. 13 are error rates (%), and a smaller value indicates a better result. In the method C, a forward selection method, the error rate is higher than that of a conventional hierarchical clustering using PCA. However, by switching the weight of each feature, reduction in the error rate by 9% is achieved. In the method D, the method according to the third example, reduction in the error rate by 9.6% in comparison with the conventional hierarchical clustering using PCA is achieved, and a higher reduction in the error rate by 15.2% is achieved by switching the weight of each feature.

From the above experimental result, it is known that, by switching the weight of each feature according to the numbers of clusters of hierarchical layers, a high error-rate reduction can be expected. Furthermore, it is known that, in the method according to the third example, it is possible to achieve a sufficiently high error-rate reduction without performing such switching. It should be noted that the switching of the weight of each feature according to the numbers of clusters of hierarchical layers can be achieved by adopting a configuration in which the weight of each feature is updated on the basis of evaluation of a hierarchical structure which is a hierarchical clustering result, and, furthermore, that the evaluation of a hierarchical structure which is a hierarchical clustering result is realized by training data in such a format that a pair having the highest degree of similarity in a triplet is specified.

Figure 14:
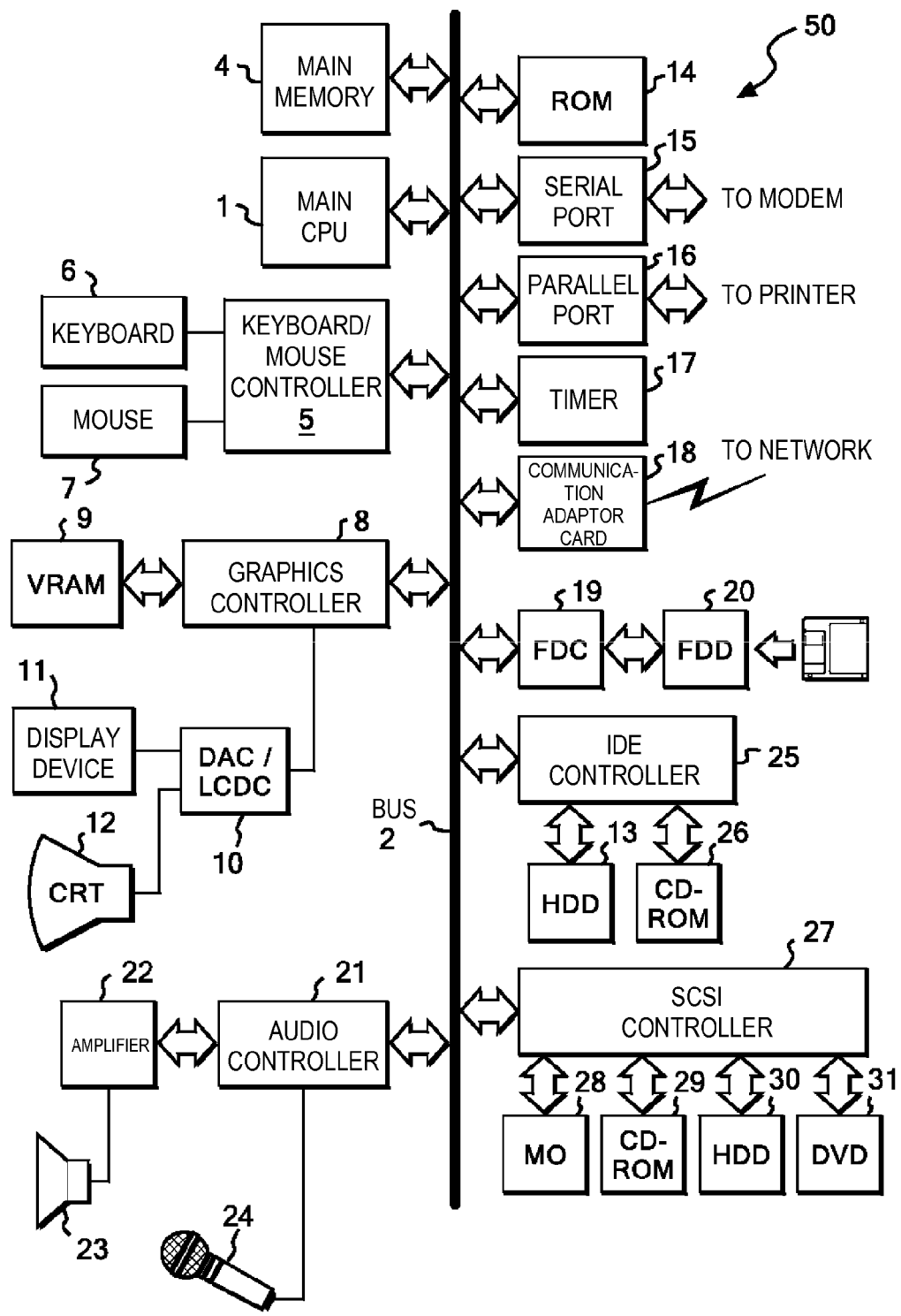
FIG. 14 shows an example of hardware configuration of an information processing apparatus preferable for realizing the learning apparatus 200 according to the embodiment of the invention as claimed in the application concerned.

FIG. 14 is a diagram showing an example of hardware configuration of a computer 50 as the weight learning apparatus 200 according to the embodiment of the present invention. The computer 50 includes a main CPU (central processing unit) 1 and a main memory 4 which are connected to a bus 2. Hard disk devices 13 and 30 and removable storages (external storage systems recording media of which are exchangeable) such as CD-ROM devices 26 and 29, a flexible disk device 20, an MO device 28 and a DVD device 31 are connected to the bus 2 via a flexible disk controller 19, an IDE controller 25 and a SCSI controller 27.

Storage media, such as a flexible disk, an MO, a CD-ROM and a DVD-ROM, are inserted into the removable storages. In these storage media, the hard disk devices 13 and 30 and the ROM 14, there can be stored a computer program code for giving instructions to the CPU 1 in cooperation with an operating system to practice the present invention. That is, in the various storage devices described above, there can be recorded a program for determining the weight of each feature, which is installed in the computer 50 and causes the computer 50 to function as the weight learning apparatus 200 according to the embodiment of the present invention, and data such as label information and the weight of each feature.

The above program for determining the weight of each feature includes an acquisition module, a hierarchical clustering module, an evaluation module and a weight updating module. These modules work the CPU 1 to cause the computer 50 to function as each of the acquisition section 205, the hierarchical clustering section 215, the evaluation section 220 and the weight updating section 225. The computer program can be compressed and divided into multiple parts to be recorded onto multiple media.

The computer 50 receives an input from an input device such as a keyboard 6 and a mouse 7 via a keyboard/mouse controller 5. The computer 50 receives an input from a microphone 24 and outputs voice from a speaker 23 via an audio controller 21. The computer 50 is connected to a display device 11 for presenting visual data to the user via a graphics controller 10. The computer 50 can connect to a network via a network adaptor 18 (such as an Ethernet(R) card and a token ring card) or the like and communicate with other computers and the like.

From the above description, it will be easily understood that the computer 50 can be realized by an information processing apparatus such as a common personal computer, a work station and a main frame or a combination thereof. The components described above are shown as examples, and all of them are not necessarily indispensable components required by the present invention.

The present invention has been described above with the use of an embodiment. The technical scope of the present invention, however, is not limited to the range described in the above embodiment. It is apparent to one skilled in the art that various modifications or improvements can be made in the above embodiment. Therefore, such modified or improved embodiments are naturally included in the technical scope of the present invention.

It should be noted that the order of execution of operations, procedures, steps and stages in each process in the devices, systems, programs and methods shown the claims, the specification and the drawings is not expressly specified with the use of "before", "prior to" and the like, and that the process can be realized in an arbitrary order unless output of previous processing is used for subsequent processing. It should be also noted that, even in the case where output of previous processing is used for subsequent processing, it is possible, in some cases, to insert different processing between the previous processing and the subsequent processing, and that, even if it is described that different processing is inserted, it is possible, in some cases, to make a change so that the previous processing is performed immediately before the subsequent processing. Even if an operation flow in the claims, the specification and the drawings is described with the use of "first", "next", "then" or the like for convenience, it does not necessarily mean that the operation flow is required to be in that order.

The invention claimed is:

1. A method executed in a computer comprising a processor and a storage section in order to determine a weight of each feature in subjective hierarchical clustering of content expressed as a combination of physical features, the method comprising steps of:

the processor acquiring multiple pieces of content separated into a triplet comprising a set of three pieces together with label information as training data, the label information indicating a pair specified by a user as having a highest degree of similarity among three pieces of the triplet, and storing the label information into the storage section;

the processor executing hierarchical clustering using a feature vector of each piece of content of training data and a weight of each feature and determining a hierarchical structure of the training data; and the processor referring to the label information stored in the storage section to provide an updated weight for each feature so that a degree of agreement between a pair combined first as being in same clusters among three contents of the triplet in the hierarchical structure and a pair indicated by the corresponding label information increases.

2. The method according to claim 1, further comprising the processor calculating an error rate which is a rate of a number of triplets for which a result of the hierarchical clustering and the label information do not agree with each other to a total number of the triplets; wherein the hierarchical clustering is repeatedly performed for the training data using the updated weight of each feature; and the processor outputs the updated weight of each feature in response to the error rate converging to a predetermined value.

3. The method according to claim 2, wherein a weight is attached to each of the triplets;

the step of determining the hierarchical structure comprises a step of executing, for each feature, hierarchical clustering on the weighted triplets using only one feature;

the step of calculating the error rate comprises a step of calculating the error rate of the hierarchical clustering for each feature in consideration of the weight of each triplet; and the step of providing an updated weight of each feature comprises a step of updating the weight of a feature having the lowest error rate using the lowest error rate, updating the weight of each of the triplets with the updated weight of the feature, and outputting the updated weight of each feature in response to one of the hierarchical clustering result not being improved any more or the update processing having been performed a number of times corresponding to a total number of features.

4. The method according to claim 1, wherein a weight is attached to each of the triplets;

the step of determining the hierarchical structure comprises a step of performing, for each feature, hierarchical clustering on the weighted triplets using only one feature;

the method further comprises a step of the processor determining an error rate of the hierarchical clustering for each feature in consideration of the weight of each triplet;

the step of providing an updated weight of each feature comprises a step of determining a temporary weight of a feature having a lowest error rate using the lowest error rate, and providing the updated weight of each of the triplets as the temporary weight; and the processor repeating the step of performing the hierarchical clustering and the step of providing an updated weight of each feature, and outputs, for each feature, a sum of temporary weights determined for the feature as the updated weight of the feature in response to the hierarchical clustering result not being improved any more or the update processing having been performed a number of times larger than a total number of features.

5. The method according to claim 1, further comprising a step of the processor acquiring one or more levels l for which a weight of each feature is to be switched and an upper-limit number of clusters $N_l$ for each level l;

the step of determining the hierarchical structure comprises a step of performing hierarchical clustering in a bottom-up method until the upper-limit number of clusters reaches $N_{l-1}$ using the weight of each feature determined for a hierarchical layer l−1, which is one level lower than the level l for which the weight is to be switched; and the step of performing the hierarchical clustering and the step of providing an updated weight of each feature are performed for the number $N_{l-1}$ clusters as new training data, and the step of providing an updated weight of each feature comprises a step of outputting a determined weight of each feature as the updated weight of each feature for the level l.

* * * * *